US00RE34791E

United States Patent [19]

Kazmierzak et al.

[11] E Patent Number: Re. 34,791

[45] Reissued Date of Patent: Nov. 15, 1994

[54] POLYMER BOUND HINDERED AMINE LIGHT STABILIZERS

[75] Inventors: Robert T. Kazmierzak; Ronald E. MacLeay, both of Williamsville, N.Y.

[73] Assignee: Atochem North America, Inc., Philadelphia, Pa.

[21] Appl. No.: 730,707

[22] Filed: Jul. 16, 1991

Related U.S. Patent Documents

Reissue of:

[64] Patent No.: 4,857,595
Issued: Aug. 15, 1989
Appl. No.: 84,603
Filed: Aug. 12, 1987

[51] Int. Cl.[5] ..... C08F 8/32

[52] U.S. Cl. ..... 525/142; 525/175; 525/194; 525/207; 525/327.6; 525/329.6; 525/375; 546/188

[58] Field of Search ..... 525/142, 175, 194, 207, 525/327.6, 329.6; 546/188

[56] References Cited

U.S. PATENT DOCUMENTS

| | | | |
|---|---|---|---|
| 2,769,804 | 11/1956 | Hanson | 260/86.7 |
| 2,971,939 | 2/1961 | Baer | 260/45.5 |
| 2,989,517 | 6/1961 | Hanson et al. | 260/93.5 |
| 3,483,276 | 12/1969 | Mahlman | 260/897 |
| 3,488,311 | 1/1970 | Burdick et al. | 260/29.6 |
| 3,509,110 | 4/1970 | Di Giulio et al. | 260/78.5 |
| 3,553,177 | 1/1971 | Hazen et al. | 260/78.5 |
| 3,555,001 | 1/1971 | Wallis et al. | 260/112 |
| 3,560,455 | 2/1971 | Hazen et al. | 260/78.5 |
| 3,560,456 | 2/1971 | Hazen et al. | 260/78.5 |
| 3,560,457 | 2/1971 | Hazen et al. | 260/78.5 |
| 3,632,561 | 1/1972 | Gibb et al. | 260/78.5 BB |
| 3,639,334 | 2/1972 | Holoch | 260/45.9 |
| 3,723,375 | 3/1973 | Field et al. | 260/29.6 TA |
| 3,755,354 | 8/1973 | Holub et al. | 260/326 E |
| 3,884,882 | 5/1975 | Caywood, Jr. | 260/78.4 |
| 3,899,491 | 8/1975 | Ramey et al. | 260/464 |
| 4,097,551 | 6/1978 | DiGiulio et al. | 260/876 B |
| 4,108,943 | 8/1978 | Lee | 260/878 R |
| 4,145,512 | 3/1979 | Uhrhan et al. | |
| 4,147,689 | 4/1979 | Thompson et al. | 260/45.9 NC |
| 4,178,279 | 12/1979 | Uhrhan et al. | |
| 4,191,683 | 3/1980 | Brunetti et al. | 260/45.8 N |
| 4,223,147 | 9/1980 | Oertel et al. | |
| 4,348,524 | 9/1982 | Karrer et al. | 546/187 |
| 4,427,828 | 1/1984 | Hergenrother et al. | 525/66 |
| 4,465,571 | 8/1984 | Hansen | 204/159.2 |

(List continued on next page.)

FOREIGN PATENT DOCUMENTS

| | | |
|---|---|---|
| 1180496 | 1/1985 | Canada . |
| 1180497 | 1/1985 | Canada . |
| 0076691 | 4/1983 | European Pat. Off. . |
| 242800 | 10/1987 | European Pat. Off. . |
| 2320310 | 10/1987 | France . |
| 3024525A1 | 2/1982 | Germany . |
| 127954 | 10/1977 | Japan . |
| 221314 | 12/1984 | Japan . |
| 221315 | 12/1984 | Japan . |
| 2145100A | 3/1985 | United Kingdom . |
| 2174093A | 10/1986 | United Kingdom . |

OTHER PUBLICATIONS

S. Rosenberger et al., "N-Salicyloylhydrazine Stabilizers for Polyolefins", *Chem. Abst.*, 78:112174b (1973).

W. B. Lutz et al., "New Derivatives of 2,2,6,6-Tetramethylpiperidine", *J. Org. Chem.*, vol. 27, pp. 1695-1703 (1962).

(List continued on next page.)

*Primary Examiner*—Bernard Lipman
*Attorney, Agent, or Firm*—Hoffmann, Wasson & Gitler

[57] ABSTRACT

Polymer bound hindered amine light stabilizers are prepared by reacting hindered amine light stabilizers containing reactive hydrazide functionalities with anhydride containing polymers or copolymers. The reactions may be carried out in an inert solvent or in a melt blending step. The polymer bound hindered amine light stabilizers are useful alone or may also be used to stabilize other polymers, copolymers or polymers blends against the deleterious effects of heat and/or light.

21 Claims, No Drawings

U.S. PATENT DOCUMENTS

| | | | |
|---|---|---|---|
| 4,469,828 | 9/1984 | Minagawa et al. | 524/100 |
| 4,481,315 | 11/1984 | Rody et al. | 524/89 |
| 4,486,570 | 12/1984 | Lordi et al. | 525/93 |
| 4,506,056 | 3/1985 | Gaylord | 524/445 |
| 4,508,874 | 4/1985 | Hergenrother et al. | 525/285 |
| 4,520,171 | 5/1985 | Diveley et al. | 525/279 |
| 4,522,983 | 6/1985 | Le-Khac et al. | 525/285 |
| 4,522,992 | 6/1985 | Verbrugge | 526/272 |
| 4,578,472 | 3/1986 | Yoshimura et al. | 546/188 |
| 4,618,634 | 10/1986 | Cantatore et al. | 524/97 |
| 4,692,486 | 9/1987 | Gugumus | 524/100 |
| 4,694,048 | 9/1987 | Choe . | |
| 4,785,063 | 11/1988 | Slongo et al. | 526/259 |

OTHER PUBLICATIONS

G. De Vito et al, "Functionalization of an Amorphous Ethylene–Propylene Copolymer by Free Radical Initiated Grafting of Unsaturated Molecules," *Journal of Polymer Science: Polymer Chemistry Ed.*, vol. 22, 1335–1347 (1984).

POLYMER BOUND HINDERED AMINE LIGHT STABILIZERS

Matter enclosed in heavy brackets [ ] appears in the original patent but forms no part of this reissue specification; matter printed in italics indicates the additions made by reissue.

BACKGROUND OF THE INVENTION

This invention relates to permanently stabilized polymers or copolymers containing hindered amine light stabilizers chemically bound to anhydride containing polymer or copolymer via diacyl hydrazide and/or N-(acylamino) functionalities.

Synthetic polymers such as polyolefins (e.g., polyethylene and polypropylene) styrenics (e.g., polystyrene, rubber modified polystyrene, ABS, etc.) polyvinyl chloride, polycarbonates, polyesters, and polyphenylene ethers are subject to degradation and discoloration upon exposure to heat and/or light with consequent deterioration of mechanical and other properties. Various stabilizers have been proposed to inhibit such deterioration. In addition to activity as a stabilizer, commercially useful stabilizer additives must have both excellant compatibility with and/or solubility in the polymeric substrate to be stabilized along with superior resistance to loss from the stabilized composition during processing and end-use application. Many stabilizer additives exhibit limited compatibility in certain substrates and excessive tendency to exude, sublime, and/or volatilize during weathering or processing of the stabilized compositions.

One approach to solving the volatility and migration problems of the stabilizers has been to prepare polymeric stabilizers. A preferred method in the industry is to attach stabilizer groups to existing polymers or copolymers containing reactive functionalities. Examples of said approach are as follows:

(i) Styrene-maleic anhydride copolymers and octadecene-maleic anhydride copolymers have been reacted with 2,2,6,6-tetramethylpiperidin-4-ol to provide semiesters containing a pendant HALS group (Canadian Pat. No. 1,180,496).

(ii) Cationic maleic anhydride homo- and copolymers were treated with 4-amino-2,2,6,6-tetramethylpiperidine to form the corresponding imide containing polymers. For example, an alternating maleic anhydride-styrene copolymer was treated with the above amine in xylene for 6 hours at 230° C. to form the corresponding styrene-N-HALS-substituted maleimide which was used as a stabilizer for polypropylene. Similar N-substituted maleimide copolymers were prepared from 4-amino-2,2,6,6-tetramethylpiperidine and copolymers of maleic anhydride with 11–15 carbons olefins, propylene and isobutylene (Ger Offen No. 3,024,525).

(iii) Maleic anhydride modified polyolefins were further modified by reacting them with 4-amino-2,2,6,6-tetramethylpiperidine to form the corresponding N-substituted maleimide modified polyolefins (U.S. Pat. No. 4,520,171). Due to their higher molecular weights and the polyolefin backbone, they are more compatible with polyolefins than with conventional hindered amine light stabilizers.

(iv) Maleic anhydride copolymers were moduled with 1-substituted-2,2,6,6-tetraalkyl-4-aminopiperidines (U.K. Patent Application No. B 2,145,100).

SUMMARY OF THE INVENTION

The present invention is directed to a polymer containing recurring units selected from the formulas

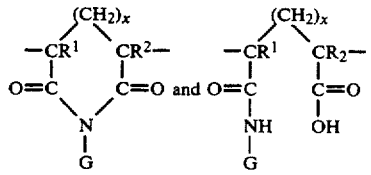

or both in which the units occur either in the polymer backbone, as pendant units, or both.

$R^1$ and $R^2$ are independently selected from hydrogen, alkyl of 1 to 6 carbons, cycloalkyl of 5 to 7 carbons, phenyl, chlorine or bromine and x is an integer of 0 or 1.

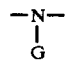

represents the residue of a hydrazido substituted hindered amine light stabilizer group.

G represents the hindered amine light stabilizer groups which are bound to the polymer or copolymer and have the structure

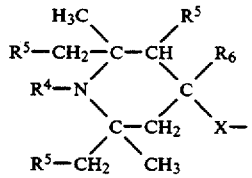

where $R^4$ is selected from hydrogen, oxyl, hydroxyl, alkyl of 1 to 20 carbons, alkenyl or alkynyl of 3 to 8 carbons, aralkyl of 7 to 12 carbons, aliphatic acyl of 1 to 10 carbons, aromatic acyl of 7 to 13 carbons, alkoxycarbonyl of 2 to 9 carbons, aryloxycarbonyl of 7 to 15 carbons, alkyl, aryl, cycloalkyl or aralkyl substituted carbamoyl of 2 to 13 carbons, hydroxyalkyl of 1 to 5 carbons, 2-cyanoethyl, epoxyalkyl of 3 to 10 carbons, or a polyalkylene oxide group of 4 to 30 carbons.

$R^5$ is selected from hydrogen or alkyl of 1 to 4 carbons.

$R^6$ is selected from hydrogen, hydroxyl, or alkoxy of 1 to 4 carbons.

When $R^6$ is hydrogen, X is a divalent radical selected from $-Z-R^7-C(=O)-N(R^8)-$, $-Z-C(=O)-N(R^8)-$, $-Z-C(=O)-R^9-C(=O)-N(R^8)-$, $-R^7-C(=O)-N(R^8)-$, or $-C(=O)-N(R^8)-$.

Z is $-O-$, $-N(R^{10})-$, or $-N(R^{12})-R^{11}-N(R^{12})-$.

In the definition of X, the orientation of the diradical is such that the hindered amine group is connected to the total end of the diradical and the polymer is connected to the right end of the diradical.

When $R^6$ is hydroxyl or alkoxy, X is a divalent radical selected from $-R^7-C(=O)-N(R^8)-$ or $-C(=O)-N(R^8)-$.

$R^7$ is an alkylene diradical of 1 to 4 carbons.

$R^8$ is selected from hydrogen, primary or secondary alkyl of 1 to 8 carbons, aralkyl of 7 to 12 carbons, or cycloalkyl of 5 to 12 carbons.

$R^9$ is selected from a direct bond or the following substituted or unsubstituted radicals of alkylene of 1 to 14 carbons, oxydialkylene of 4 to 10 carbons, thiodialkylene of 4 to 10 carbons, alkenylene of 2 to 10 carbons, o, m or p-phenylene. Substituents for $R^9$ are selected from lower alkyl, lower alkoxy, hydroxy, bromine, chlorine, mercapto, or lower alkylmercapto.

$R^{10}$ and $R^{12}$ are selected from hydrogen, alkyl of 1 to 10 carbons, aryl of 6 to 12 carbons, aralkyl of 7 to 12 carbons, and cycloalkyl of 5 to 12 carbons and $R^{10}$ may also be a radical of the formula

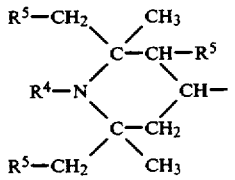

or a 2-cyanoethyl radical.

$R^{11}$ is alkylene of 2 to 12 carbons.

Preferably, $R^4$ is hydrogen, methyl, acetyl, benzoyl, 2-hydroxyethyl or benzyl; $R^5$ is hydrogen or methyl; $R^6$ is hydrogen; and X is selected from —Z—$R^7$—C(=O)—N($R^8$)— or —Z—C(=O)—$R^9$—C(=O)—N($R^8$)—; Z is —N($R^{10}$)—; $R^7$ is —$(CH_2)_b$—; $R^8$ is hydrogen; $R^9$ is a direct bond or —$(CH_2)_b$—; b is 1 or 2 and $R^{10}$ is hydrogen or a 2,2,6,6-tetramethyl-4-piperidinyl radical. Most preferably, $R^4$ is hydrogen or methyl; X is selected from —Z—$R^7$—C(=O)—N($R^8$)— or —Z—C(=O)—$R^9$—C(=O)—N($R^8$)—; Z is —N($R^{10}$)—; $R^5$, $R^6$ and $R^8$ are hydrogen; $R^{10}$ is hydrogen or 2,2,6,6-tetramethyl-4-piperidinyl; $R^7$ is —$(CH_2)_b$—; $R^9$ is a direct bond and b is 1 or 2.

DETAILED DESCRIPTION OF THE INVENTION

General preparative methods

The polymer bound hindered amine light stabilizers of this invention are prepared by reacting hindered amine light stabilizers bearing hydrazide functionalization with anhydride containing polymers or copolymers. In the reaction, the stabilizers attach to the polymer or copolymer in the form of a substituted amide group or a substituted imide group.

Starting Materials

Hydrazido Functionalized Hindered Amine Light Stabilizers

Most of the hydrazido functionalized hindered amine light stabilizers used as starting materials for the preparation of the composition of this invention are derivatives of 4-amino-2,2,6,6-tetraalkylpiperidines. The 4-amino-2,2,6,6-tetraalkylpiperidines are usually prepared by the reductive amination of 2,2,6,6-tetraalkylpiperidones with ammonia or primary amines [See U.S. Pat. No. 4,191,683 or W. B. Lutz, S. Lazarus and R. I. Meltzer, J. Org. Chem. 27,1695 (1962)]. 4-Amino-2,2,6,6-tetramethylpiperidine, N-butyltriacetonediamine and bis(2,2,6,6-tetramethyl-4-piperidyl)amine are available from Huls Chemische Werke in Germany.

Prior to the reductive amination, alkyl, alkenyl, alkynyl, aralkyl, hydroxyalkyl or 2-cyanoethyl groups may be introduced on the hindered nitrogen by standard alkylation techniques using alkyl, alkenyl, alkynyl or aralkyl halides, dialkyl sulfates, alkylene oxides or acrylonitrile. Alternatively, the 4-amino-2,2,6,6-tetraalkylpiperidine may be converted to the corresponding 4-benzoylamino-2,2,6,6-tetraalkylpiperidine, the hindered amine alkylated with one of the above alkylating agents and then the benzoyl group hydrolyzed with concentrated hydrochloric acid. These techniques are demonstrated in U.S. Pat. No. 4,223,147.

The 4-amino-2,2,6,6-tetraalkylpiperidines or their 1-substituted derivatives may be reacted with an excess of a diester to form a monoamide-monoester which can then be reacted with hydrazine, hydrazine hydrate or a mono-substituted alkylhydrazine to form a hydrazido substituted hindered amine light stabilizer. The intermediate monoamide-monoesters may also be prepared by the reaction of the 4-amino-2,2,6,6-tetraalkylpiperidine with mono acid chlorides-mono esters of dicarboxylic acids or mono esters of dicarboxylic acids followed by esterification of the carboxyl group. Some may also be prepared by reaction with a cyclic anhydride of a 1,2 or 1,3-dicarboxylic acid followed by esterification of the carboxyl group. The intermediate monoamide-monoesters may be alkylated on the hindered nitrogen if it is unsubstituted with the above alkylating agents or acylated with aliphatic or aromatic acid chlorides, chloroformates, carbamoyl chlorides, or isocyanates. The alkylation or acylation of the unsubstituted hindered nitrogen should be carried out prior to the conversion of the intermediate mono-amide-monoester to the hydrazide. These techniques are demonstrated in U.S. Pat. Nos. 4,348,524 and 4,191,683.

The 4-amino-2,2,6,6-tetralkylpiperidines or their 1-substituted derivatives may be added to alkyl acrylates and methacrylates via Michael Addition to form 2,2,6,6-tetraalkyl-4-piperidinyl substituted propionates or 2-methylpropionates which are then reacted with a hydrazine to form the corresponding hydrazide. Alkylation or acylation of the hindered nitrogen of the intermediate ester may be carried out if desired prior to the hydrazinolysis step. These techniques are also demonstrated in U.S. Pat. No. 4,223,147.

The semicarbazide derivatives are prepared by reacting the 4-amino-2,2,6,6-tetraalkylpiperidines or their 1-substituted derivatives with diphenyl carbonate and then reacting the resulting phenyl carbamate with a hydrazine. Again substitution on the hindered nitrogen may be performed on the intermediate phenyl carbamate prior to the hydrazinolyis step. This technique is also demonstrated in U.S. Pat. No. 4,223,147.

Hydrazido functionalized hindered amine light stabilizers may also be prepared by reacting halo-substituted esters such as lower alkyl chloroacetates or bromopropionates with 4-amino or 4-hydroxy-2,2,6,6-tetraalkylpiperidines to form the HALS substituted acetates or propionates (U.S. Pat. Nos. 4,578,472 and 4,618,634) which are readily converted to the corresponding hydrazides with a hydrazine.

The carbazate derivatives are prepared by reacting a 4-hydroxy-2,2,6,6-tetraalkylpiperidine or a 1-substituted derivative with phosgene or phenyl chloroformate in the presence of a base to form the symmetrical carbonate or the phenyl carbonate respectively. Again, substitution on the hindered nitrogen (if unsubstituted) may be effected at this point if desired. Hydrazinolysis of the carbonate or the phenyl carbonate using little or no excess hydrazine will produce the 2,2,6,6-tetraalkyl-4-piperidinyl carbazate (or its 1-substituted derivative).

4-Hydroxy-2,2,6,6-tetramethylpiperidin-4-ol and 4-hydroxy-1,2,2,6,6-pentamethylpiperidin-4-ol are both available from Huls Chemische Werke.

Hydrazido functionalized hindered amine light stabilizers containing oxyl substituents on the hindered nitrogen are prepared by reacting the corresponding unsubstituted hindered nitrogen with a peracid or hydrogen peroxide in the presence of tungsten catalysts (U.S. Pat. No. 4,348,524). The oxidation of the unsubstituted hindered amine to the oxyl radical is preferably carried out on the various intermediates prior to the hydrazinolysis step. The oxyl radical may be converted to a hydroxyl radical in the presence of a hydrogen radical donor.

Hindered amine light stabilizers bearing reactive hydrazide functionalities which may be reacted with the anhydride polymers or copolymers include the following non-exclusive examples:

3-(2,2,6,6-tetramethyl-4-piperidinylamino)propionhydrazide,
3-(1,2,2,6,6-pentamethyl-4-piperidinylamino)propionhydrazide,
(2,2,6,6-tetramethyl-4-piperidinylamino)acetylhydrazide,
(1,2,2,6,6-pentamethyl-4-piperidinylamino)acetylhydrazide,
N-(2,2,6,6-tetramethyl-4-piperidinyl)hydrazinecarboxamide,
N-(1,2,2,6,6-pentamethyl-4-piperidinyl)hydrazinecarboxamide,
N-(2,2,6,6-tetramethyl-4-piperidinyl)-N'-aminooxamide,
N-(1,2,2,6,6-pentamethyl-4-piperidinyl)-N'-aminooxamide,
N-(2,2,6,6-tetramethyl-4-piperidinyl)-N'-aminosuccinamide,
N-(1,2,2,6,6-pentamethyl-4-piperidinyl)-N'-aminosuccinamide,
N-(2,2,6,6-tetramethyl-4-piperidinyl)-N'-aminomalonamide,
N-(1-benzyl-2,2,6,6-tetramethyl-4-piperidinyl)-N'-aminomalonamide,
N-(1-benzyl-2,2,6,6-tetramethyl-4-piperidinyl)-N'-aminooxamide,
N-(1-beta-hydroxyethyl-2,2,6,6-tetramethyl-4-piperidinyl)-N'-aminooxide,
N-(2,6-diethyl-2,3,6-trimethyl-4-piperidinyl)-N'-aminoadipamide,
N-(1-acetyl-2,2,6,6-tetramethyl-4-piperidinyl)-N'-aminooxamide,
3-(1-acetyl-2,2,6,6-tetramethyl-4-piperidinylamino)propionhydrazide,
(2,2,6,6-tetramethyl-4-piperidinyloxy)acetyl hydrazide,
(1,2,2,6,6-pentamethyl-4-piperidinyloxy)acetylhydrazide,
3-(2,2,6,6-tetramethyl-4-piperidinyloxy)propionhydrazide,
3,(1,2,2,6,6-pentamethyl-4-piperidinyloxy)propionhydrazide,
N-(1-acetyl-2,2,6,6-tetramethyl-4-piperidinyl)hydrazinecarboxamide,
N-(1-benzoyl-2,2,6,6-tetramethyl-4-piperidinyl)-N'-aminooxamide,
3-(1-benzoyl-2,2,6,6-tetramethyl-4-piperidinylamino)-propionhydrazide,
N,N-bis-(2,2,6,6-tetramethyl-4-piperidinyl)-N'-aminooxamide, and
3-[N,N-bis(2,2,6,6-tetramethyl-4-piperidinyl)amino]propionhydrazide.

Anhydride Containing Polymers

In general, any polymer or copolymer containing pendant cyclic anhydride groups, either on the polymer backbone or grafted side chains, is suitable for attachment of the reactive hydrazido substituted hindered amine light stabilizers to form the polymer bound stabilizers of this invention. Due to cost and ease of preparation, the anhydride containing polymers are preferably polymers or copolymers of maleic anhydride.

The polymer bound stabilizers of this invention are prepared from anhydride polymers or copolymers with recurring units selected from

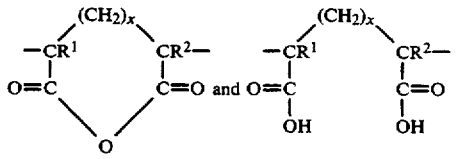

in which the units occur either in the polymer backbone, or as pendant units or both; $R^1$, $R^2$ and x are as previously defined.

The polymer bound hindered amine light stabilizers of this invention may be prepared by reacting hindered amine light stabilizers bearing reactive hydrazide functionalities with these anhydride containing polymers or copolymers.

Suitable anhydride containing copolymers useful for employment in this invention include but are not limited to: (a) styrene-maleic anhydride copolymers, (b) alternating copolymers of maleic anhydride and alpha-olefins, (c) copolymers of alkyl vinyl ethers and maleic anhydride, (d) maleic anhydride modified polyolefins, (e) maleic anhydride adducts of hydrogenated polymers or copolymers, (f) maleic anhydride adducts of EPDM, and (g) other anhydride copolymers.

(a) Styrene-maleic anhydride copolymers

These copolymers are a general class of compounds of alternating copolymers of styrene and maleic anhydride, or the non-equimolar copolymers containing less than about 50 mole percent of the anhydride monomer. The styrene may be replaced in whole or in part by other vinylaromatic monomers such as alpha-methylstyrene, nuclear methylstyrenes, ethylstyrene, isopropylstyrene, t-butylstyrene, chlorostyrenes, dichlorostyrenes, bromostyrenes, dibromostyrenes, vinylnaphthalene, and the like. Similarly, the maleic anhydride can be replaced in whole or in part by another alpha, beta-unsaturated cyclic dicarboxylic acid anhydride such as itaconic, aconitic, citraconic, mesaconic, chloromaleic, bromomaleic, dichloromaleic, dibromomaleic, phenylmaleic, and the like. The preferred alpha, beta-unsaturated cyclic anhydride is maleic anhydride. The copolymer may also contain a termonomer such as a 1-3 carbons alkyl acrylate or methacrylate, acrylonitrile, methacrylonitrile, acrylamide, methacrylamide, acrylic acid, or methacrylic acid.

Also suitable are the rubber-modified copolymers where 5 to 40 percent by weight of one of the known elastomers has been incorporated into the vinylaromatic-alpha, beta-unsaturated dicarboxylic acid anhydride copolymer. The elastomers may be incorporated into the anhydride copolymers by blending, mixing, or copolymerizing the monomers in the presence of the rubber.

Suitable rubbers, or elastomers, include conjugated 1,3-diene rubbers, styrene-diene copolymer rubbers, acrylonitrile-diene copolymer rubbers, ethylene-propylene-diene terpolymer rubbers, acrylate-diene copolymer rubbers, and mixtures thereof.

Preferred rubbers are diene rubbers such as homopolymers of conjugated dienes such as butadiene, isoprene, chloroprene, and piperylene and copolymers of such dienes with up to 50 mole percent of one or more copolymerizable mono-ethylenically unsaturated monomers, such a styrene, substituted styrenes, acrylonitrile, methacrylonitrile and isobutylene.

Particularly suitable for use are the non-equimolar copolymers of styrene and maleic anhydride designated Dylark TM copolymers, commercially available from ARCO Chemical Company. Suitable Dylark copolymers include those of the 200 series and the 300 series and Dylark TM 600 and 700. Those copolymers designated Dylark TM 250, Dylark TM 350 and Dylark TM 700 are impact modified.

The SMA TM resins are low molecular weight styrene-maleic anhydride copolymers (MW 700–1900) and are also useful in this invention. The low molecular weight SMA resins SMA TM 1000, 2000 and 3000 available from ARCO are particularly useful in this invention.

Also suitable are the styrene-maleic anhydride copolymers or rubber modified styrene-maleic anhydride copolymers where a portion of the maleic anhydride groups are converted to maleimide groups or N-substituted maleimide groups. The molar ratio of the amine to the maleic anhydride in the copolymer should be less than 0.8 to allow attachment of the stabilizer groups. The formation of the maleimide groups that don't contain stabilizer groups may be formed before, during or after the formation of the maleimide groups containing stabilizer groups. Suitable amines for this purpose are ammonia, primary alkyl amines and primary aryl amines. Long chain primary alkyl amines will beneficially aid in flow properties of the system while primary aryl amines will increase the thermal stability and heat distortion properties of the system. Aniline is the preferred aromatic amine for increasing the thermal stability of the polymer system. Brominated or chlorinated primary amines will increase the fire retardancy of the system.

The SMA copolymer may optionally contain a termonomer such as a 1 to 3 carbons alkyl acrylate or methacrylate, acrylonitrile, methacrylonitrile, acrylamide, methacrylamide, acrylic acid or methacrylic acid. Incorporation of the methacrylate comonomer at specific levels (2 to 20% by weight) increases the heat distortion temperature of the polymer, raises the tensile strength and increases the gloss of the rubber-modified polymer.

The Cadon TM resins (Monsanto Chemical Company) are a commercial series of styrene-maleic anhydride polymer alloys with ABS. Rubber-modified versions are also available. These resins are also suitable for this invention.

Also suitable are the rubber modified styrene maleic anhydride resins described in U.S. Pat. No. 4,522,983 where a minor amount of a nuclear substituted methylstyrene is included in the composition to increase the impact strength of the composition.

The styrene-maleic anhydride polymers may be further modified by copolymerizing the monomers in the presence of other monomers. In addition to the acrylates, methacrylates, acrylonitrile and methacrylonitrile previously mentioned, other suitable monomers include the ethlenically unsaturated carboxylic acids, preferably acrylic and methacrylic acids, acrylamide and methacrylamide, dialkylamino 1–6 carbons alkyl acrylates or methacrylates such as dimethylaminoethyl acrylate or methacrylate, and vinyl esters derived from saturated carboxylic acids of 2 to 22 carbons such as vinyl acetate or vinyl propionate.

Further modification of the styrene-maleic anhydride copolymers can be accomplished by carrying out the copolymerization in the presence of crosslinking monomers having two or more ethylenically unsaturated double bonds such as divinylbenzene, 1,4-butadiene, divinyl ether, ethylene glycol dimethacrylate, butanediol dimethylacrylate, triallyl cyanurate and similar type compounds. The crosslinking monomers are employed in amounts of from 0.01 to 5, preferable from 0.1 to 2 mole percent based on maleic anhydride.

(b) Alternating copolymers of maleic anhydride and alpha-olefins

The copolymers are exemplified by U.S. Pat. Nos. 3,553,177, 3,560,455, 3,560,456 and 3,560,457. Each of these patents describes a copolymer of maleic anhydride with a specific alpha-olefin such as 12–30 carbons alpha-olefins. The copolymers of 6–10 carbons alpha-olefins are known as shown by U.S. Pat. No. 3,488,311. Terpolymers of maleic anhydride and at least one lower alpha-olefin and at least one higher alpha-olefin are also know, as shown by Canadian Pat. No. 1,180,497.

PA-18 is an example of a commercially available alternating copolymer of maleic anhydride and octadecene-1 (product of the Chevron Chemical Co.).

Also suitable for this invention are the terpolymers disclosed in U.S. Pat. Nos. 4,522,992 and 3,723,375. These are basically terpolymers of cyclic alpha, beta-unsaturated dicarboxylic acid anhydrides, aromatic mono-alkenyl monomers and higher 1-alkenes. Preferably, they are terpolymers of styrene, maleic anhydride and alpha-olefins having 10 or more carbon atoms. Both pure alkenes and mixed alkenes can be utilized in preparing the terpolymers.

(c) Alternating copolymers of alkyl vinyl ethers and maleic anhydride

These copolymers are readily prepared in bulk or solution using free radical initiators (e.g., lauroyl peroxide) (British Pat. No. 1,117,515).

Low, medium, and high molecular weight grades are commercially available. Commercial grades include the Gantrez TM resins (General Aniline and Film). Suitable alkyl vinyl ethers for this invention include methyl, ethyl, propyl, isopropyl, n-butyl, isobutyl, amyl, isoamyl, hexyl, heptyl, octyl, 2-ethylhexyl, nonyl, decyl, dodecyl, hexadecyl, and octadecyl vinyl ethers.

(d) Maleic anhydride modified polyolefins

The maleic anhydride modified polyolefins which can be employed in this invention have the general formula:

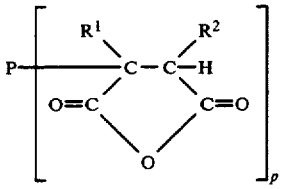

where P- represents an olefin polymer residue which is based on a preponderance of ethylene, propylene or 1-butene, and having a valence of p. It can be either a high or low density polyethylene residue, a polypropylene residue or a residue of a copolymer of ethylene with 1-butene, a residue of a copolymer of ethylene and propylene, a residue of a propylene-butene copolymer or a residue of such a propylene copolymer with an olefin having up to about six carbon atoms.

These materials contain about 0.2 to 9% by weight of combined maleic anhydride, preferably about 2 to 5%. In fact, one embodiment of these materials is a commercially available product, sold under the trademark "Hercoprime TM by Hercules Incorporated. Polyethylene modified with maleic anhydride is available commercially from Enron Chemical Co. under the trademark "Plexar TM ". Any polymer or copolymer of ethylene, propylene, or 1-butene can be modified via the maleic anhydride moiety to form the substrate molecule, including polyethylene, polypropylene, ethylene-propylene copolymer, propylene-butene-1 copolymer, or butene-1-ethylene copolymer. The most frequently encountered and the preferred maleic anhydride modified polyolefin is that based on polypropylene.

The olefin polymer based maleimides of the invention are prepared by graft modifying the appropriate polymer backbone with a maleic anhydride and, thereafter, reacting said anhydride modified olefin polymer with hindered amine light stabilizers containing hydrazide functionalities. A less preferred method is to modify the appropriate polymer backbone with N-(stabilizer substituted)maleimides of formula:

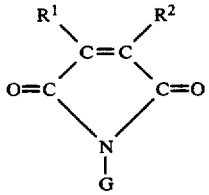

where $R^1$, $R^2$ and G are as previously defined.

The graft modification of EPDM by maleic anhydride in the presence of dicumyl peroxide and benzoyl peroxide is described by DeVito and co-workers (G. DeVito, N. Lanzetta, G. Maglio, M. Malinconico, P. Musta, R. Palumbo, J. Polym. Sci., Polym. Chem, Ed., 22, pp. 1335–47 (1984)).

(e) Maleic anhydride adducts of hydrogenated polymers or copolymers

These polymers are polymeric products containing pendant succinic anhydride groups which are formed by reacting maleic anhydride with hydrogenated polymers of conjugated dienes or hydrogenated copolymers of conjugated dienes and vinyl aromatic hydrocarbons containing a residual unsaturation level of from 0.5 to 20 percent of their original unsaturation level prior to hydrogenation. The reaction which is conducted by heating a mixture of the maleic anhydride and hydrogenated polymer or copolymer containing residual unsaturation proceeds by means of a reaction mechanism referred to as an "ENE" type reaction. The maleic anhydride adds to the unsaturation of the polymer to form the polymer product containing the pendant succinic anhydride groups. This polymer by virtue of the pendant anhydride groups can be reacted with the hindered amine light stabilizers containing hydrazide groups to form the polymer bound stabilizers of this invention.

The amounts of maleic anhydride employed in the reaction can vary considerably depending on the specific nature of the hydrogenated polymer and the properties desired in the final product. In general, the amount of maleic anhydride employed may range from 0.1 to about 25 percent by weight based on total weight of maleic anhydride and hydrogenated polymer with a preferred amount being from 0.2 to 5 percent by weight.

Various polymers of conjugated dienes and copolymers of conjugated dienes and vinyl aromatic hydrocarbons may be hydrogenated for use in preparing the maleic anhydride adduct component of the compositions of the invention. Polymers of conjugated dienes which may be hydrogenated include polymers derived from one or more conjugated diene monomers. Thus, polymers derived from a single conjugated diene such as 1,3-butadiene (i.e. a homopolymer) or polymers derived from two or more conjugated dienes such as, for example, 1,3-butadiene and isoprene or 1,3-butadiene and 1,3-pentadiene (i.e., a copolymer) and the like may be utilized. Copolymers which may be hydrogenated include random copolymers of conjugated dienes and vinyl aromatic hydrocarbons and block copolymers of conjugated dienes and vinyl aromatic hydrocarbons which exhibit elastomeric properties.

Examples of polymers of conjugated dienes and random and block copolymers of conjugated dienes and vinyl aromatic hydrocarbons that can be utilized in the invention are described in European patent application No. 0,103,148.

(f) Maleic anhydride adducts of EPDM

These adducts are prepared by the thermal addition of maleic anhydride to elastomeric copolymers of ethylene and propylene which have a substantially saturated hydrocarbon backbone chain and unsaturated hydrocarbon side-chains. The preparation of these adducts is described in U.S. Pat. No. 3,884,882.

(g) Other anhydride copolymers

Examples of other anhydride copolymers are as follows:

(1) vinyl acetate-maleic anhydride copolymer,
(2) ethylene-vinyl acetate-maleic anhydride terpolymer,
(3) isobutylene-maleic anhydride copolymer.
(4) graft polyols containing styrene-maleic anhydride copolymer in the grafted chain,
(5) styrene-maleic anhydride-2,4,6-tribromophenyl acrylate terpolymer,
(6) maleic anhydride-divinylbenzene-styrene terpolymer,
(7) ethylene-maleic anhydride-styrene graft copolymer,
(8) methyl methacrylate-maleic anhydride copolymers,
(9) butyl methacrylate-maleic anhydride-styrene copolymer, and

(10) ethylene-maleic anhydride copolymers (Monsanto).

Other suitable maleic anhydride copolymers include the terpolymers of anhydrides, aromatic mono-alkenyl monomers and higher 1-alkenes described in U.S. Pat. No. 4,522,992, the tribromophenyl acrylate-epichlorohydrin-maleic anhydride-styrene copolymer described in U.S. Pat. No. 4,108,943, and the methyl methacrylate-maleic anhydride-styrene copolymers disclosed in Japanese Pat. Nos. 59/221,314 and 59/221,315 (CA102: 150317x and 150318y), divinyl ether-maleic anhydride copolymers from Adica Labs (Pivan), a polybutadiene-polystyrene-maleic anhydride terpolymer referred to as Ricon TM 184/MA, a product of Colorado Chemical Specialties, Inc., and ethylene/vinyl acetate copolymer grafted with maleic anhydride such as Modic E 310 K a product of Mitsubishi Chemical Industries Co.

Anhydride polymers containing glutaric anhydride units can also be used in this invention. Such polymeric anhydrides are available from polymers and copolymers of acrylic and methacrylic acid by heating under dehydrating conditions with or without a catalyst (European Pat. No. 76,691).

In addition poly(maleic anhydride) such as Belcene, a product of Ciba-Geigy, is also suitable in this invention.

SYNTHESIS

This invention is based on the analogous reaction of an anhydride with an amine to yield an amide and a carboxylic acid. Cyclic anhydrides and primary amines react similarly to give a product with both amide and carboxylic acid functional groups. This amide-carboxylic acid is called an amic acid. Hydrazides react in a similar manner with anhydrides to form an acyl hydrazide and a carboxylic acid. Cyclic anhydrides and hydrazides react to form a product which contains both acyl hydrazide and carboxylic acid functional groups. Now, however, the acyl hydrazide is called an N-(acylamino)amide; the product is again both an amide and carboxylic acid and is thus called an amic acid. If an amic acid (whether from an amine or hydrazide) is heated, further reaction occurs in which a molecule of water is lost and a ring is formed with two carbonyl groups attached to the amide nitrogen. This product is called an imide (from a hydrazide this is more accurately an N-(acylamino)imide).

Depending upon the substitution of the anhydride and amine, the formation of amic acid and its conversion to imide occur under a wide range of reaction conditions, particularly reaction temperature and duration. Temperature is usually the dominant factor. Below a certain temperature (about 100° C.) the amic acid will not convert to the imide without the aid of a coreactant. Above a certain temperature (about 175° C.) an amic acid, once formed, will begin conversion to the imide immediately. Very short reaction times, like those obtainable in a melt blender or extruder can yield mixtures of both amic acid and imide. At intermediate temperatures the reaction duration becomes important and mixtures of amic acid and imide result, the amount of each formed depends upon the duration.

The reaction of the hindered amine light stabilizers containing reactive hydrazide functionalities (i.e., acid hydrazides, carbazates and semicarbazides unsubstituted on the terminal nitrogen of the hydrazide group) with anhydride containing polymers or copolymers may be carried out in inert solvents such as toluene, xylene, chlorobenzene, mesitylene dimethylformamide, N-cyclohexyl pyrrolidone and tetrahydrofuran. In some cases if the reaction temperature is not hot enough, the reaction may stop at the intermediate amic acid or only partial conversion of the amic acid to the imide may occur. The amic acids cyclize to the desired imides at higher temperatures.

Preferably, the reactive stabilizers are attached to the anhydride containing polymers or copolymers by a melt blending step in the absence of a solvent. This can be accomplished at a temperature above the softening point of the anhydride polymer or copolymer using any conventional melt mixing apparatus such as a plastograph, Banbury mixer, two roll mill, single or twin screw extruder or any other method which applies sufficient heat (e.g., 175° to 275° C.) and shear to the ingredients to obtain a satisfactory blend. Preferably, the reaction is carried out in an inert atmosphere such as nitrogen.

The reaction may be carried out for times varying from 30 seconds to 48 hours depending upon the degree of conversion of the anhydride to imide desired, the reactivity of the reactive stabilizers, the reaction temperature employed, the presence or absence of a solvent and the use of non-use of a catalyst. Higher reaction temperatures naturally reduce the required reaction time for any particular system of reactants. Preferably, the reactions are carried out at temperatures between 125° and 225° C. Shorter reaction times are possible when running the reaction in the melt form in the absence of solvents. Short reaction times and/or low reaction temperatures may lead to some uncyclized amic acid intermediates. Cyclization to the imides can be accomplished by raising the temperature above 200°–230° C., either in the reaction step or a subsequent melt blending step with a host polymer or polymer blend which is to be stabilized by the light stabilizer.

In addition, the polymer bound hindered amine light stabilizers can be prepared in the presence of inert polymers such as HIPS, ABS, SAN, MBS, ASA, polystyrene, polyolefins, various copolymers of polystyrene and rubbery materials, PPO, PPE and various combinations thereof. These stabilized polymer alloys or blends can be prepared in solution or in a melt blending step in any conventional melt mixing apparatus such as a Banbury mixer or an extruder. In addition, once the stabilizers are attached to the anhydride polymers or copolymers, the modified anhydride polymer or copolymer (or modified anhydride polymer or copolymer blend) may be blended with polymers or copolymers containing reactive carbonyl groups such as nylon, polycarbonate, polyesters and polyacrylates.

It is within the scope of this invention that the anhydride polymers or copolymers may be partially imidized with ammonia, primary alkyl or aromatic amines and the residual anhydride groups either totally or partially reacted with the reactive stabilizers to form maleimide groups. Likewise, the anhydride polymers or copolymers may be reacted with the reactive stabilizer groups first and then the residual anhydride groups either totally or partially reacted with ammonia, primary alkyl, or aromatic amines or the anhydride copolymers may be reacted simultaneously with the reactive stabilizers and the primary amines. A particularly preferred embodiment is to partially imidize the anhydride copolymer with an 8–200 carbons primary alkyl amine or mono amine-terminated poly(oxyalkylene). Small amounts of mono-amine-terminated Jeffamines (primary amine terminated block copolymers of ethylene oxide and propylene oxide, products of Texaco Chemical Company) will contribute advantageous mold release properties to the polymers or copolymers. These 8-200 carbon alkyl or poly(oxyalkylene) substituents will also lower the Tg of the modified copolymers, increase their compatibility with other polymeric compositions such as polyolefins, lower processing temperatures, increase melt flow and may also contribute to lubricating properties.

Residual carboxyl or anhydride groups may be reacted with aqueous bases or metallic oxides to form ammonium or metal salts along the polymer. Care must be taken to avoid saponification of the stabilizer groups.

It is also within the scope of this invention that the anhydride polymers or copolymers may be partially imidized with other functionalized amines or hydrazides which will add additional properities to the polymers or copolymers. For example, attachment of trialkoxysilylalkylamines such as amino-methyltrimethoxysilane, 3-aminopropyltriethoxysilane or 3-aminopropyltri(n-propyloxy)silane (see U.S. Pat. No. 3,755,354) will enhance the ability of the polymer or copolymer system to accept fillers. Likewise, reaction of chlorinated or brominated primary amines or hydrazides will contribute flame retardant properties to the polymers or copolymers. Antistatic properties can be introduced in a similar manner. For example, the anhydride copolymers may be partially reacted with 3-dimethylaminopropylamine to form the 3-dimethylaminopropylimide and then in a subsequent step the dimethylaminopropyl group may be quarternized with an alkyl halide such as methyl iodide (see U.S. Pat. No. 3,555,001). Likewise, minor amounts of 4-amino-2,2,6,6-tetramethylpiperidine or 4-amino-1,2,2,6,6-pentamethylpiperidine may be present in the reactive hydrazido functionalized hindered amine light stabilizers. The amines will attach to the anhydride containing polymers to contribute additional light stabilizing properties and may save on expensive purification steps in the preparation of the hydrazido functionalized HALS.

When the attachments are run in solution, the products can be isolated by removal of the solvent or by precipitation of the product in a non-solvent such as methanol or hexane. In the latter case, the product is separated from the solvent, washed with fresh non-solvent and dried in an oven at elevated temperature, preferably, under vacuum or an inert atmosphere.

When the attachments are carried out in a mixer in the molten state, the blended product is cooled, ground up in a grinder, and dried in an oven at elevated temperatures, preferably under vacuum or an inert atmosphere. When the reaction is carried out in an extruder, the extrudate is cooled, preferably either by an inert gas or by a cooling bath, dried if necessary, pelletized or ground up and, if necessary, redried in an oven.

It is also within the scope of this invention to prepare the polymer bound hindered amine light stabilizers of this invention where the light stabilizing group is attached to the polymer by a diacyl hydrazide function. The polymer bound stabilizer (in the amic acid form) is then subjected to a further heat treatment such as melt blending step either in the absence or presence of another polymeric composition in which the diacylhydrazide (amic acid) cyclizes to the N-(acylamino)imide with the loss of water. Examples of such heat treatments include extrusions, injection moldings and hot compounding.

The polymer bound hindered amine light stabilizers of this invention may also be prepared by copolymerizing ethylenic or vinyl aromatic monomers with N-substituted imides (or N-unsubstituted amic acids) of cyclic alpha, beta-unsaturated dicarboxylic acid anhydrides containing hindered amine light stabilizing groups attached to the imide nitrogen (or the amide nitrogen of the amic acid) by an acylamino, alkoxyacylamino or aminoacylamino linkage.

In a prior step the alpha, beta-unsaturated cyclic imides are prepared by reacting the corresponding cyclic alpha, beta-unsaturated dicarboxylic anhydride (preferably maleic anhydride) with hindered amine light stabilizers bearing reactive (i.e., unsubstituted terminal nitrogens) hydrazido functionalities (i.e., acylhydrazide, semicarbazide or carbazate) in an inert solvent such as toluene, xylene, dimethylformamide, chlorobenzene, or dichlorobenzene. Suitable hydrazide functionalized hindered amine light stabilizers which can be employed in this prior step include those previously named above (D-1) for the modification of anhydride containing polymers and copolymers.

The ethylene or vinyl aromatic monomers (or various mixtures thereof) may be copolymerized with the unsaturated hindered amine substituted imides (or amic acids) using any of the well known methods employed in the art for copolymerizing ethylenic or vinyl aromatic monomers with maleic anhydride or maleimide. Examples of such methods are described in U.S. Pat. Nos. 2,971,939, 2,769,804, 2,989,517, and 3,509,110. In addition, 5 to 40 percent by weight of one of the known elastomers may be incorporated into the copolymer by copolymerizing the monomers in the presence of the rubber. Preferably, the elastomers are incorporated into the monomer mixture prior to polymerization using, for example, the methods of U.S. Pat. Nos. 4,097,551 or 4,486,570. Preferred rubbers are diene rubbers such as homopolymers of conjugated dienes such as butadiene, isoprene, chloroprene or piperylene and copolymers of such dienes with up to 50 mole percent of one or more copolymerizable mono-ethylenically unsaturated monomers, such as styrene, substituted styrenes, acrylonitrile, methacrylonitrile and isobutylene.

The polymer bound hindered amine light stabilizers of this invention may also be prepared by grafting N-substituted imides (or N-substituted amic acids) of cyclic alpha, beta-unsaturated dicarboxylic acid anhydrides containing hindered amine light stabilizers attached to the imide nitrogen (or the amide nitrogen of the amic acid) by an acylamino, alkoxyacylamino or aminoacylamino linkage onto a polymer. The polymer may be a high or low density polyethylene, a polypropylene or a copolymer of alpha olefins having up to about six carbons. Examples of such copolymers are ethylene-butene-1, ethylene-propylene and propylene-butene-1 copolymers. The method of grafting the cyclic alpha, beta-unsaturated imides onto the polyolefins is similar to the methods of grafting maleic anhydride onto polyolefins. Briefly, the preparation consists of treating the polymer with a free radical initiator which generates free radicals on the polymer. The free radical sites on the polymer can then add on the unsaturated cyclic imides. Active radical sites on the polymer backbone can also be induced by subjecting the polymer to, the action of high energy ionizing radiation such as gamma rays, X-rays or high speed electrons or by simply milling the polymer in the presence of air. Examples of applicable methods are described in U.S. Pat. Nos. 3,483,276 and 4,506,056.

The polymers of this invention are useful as thermal and light stabilizers for synthetic polymers which are normally subject to thermal, oxidative or actinic light degradation. Since the stabilizer groups are bound to polymers they will not be lost from the polymer system by volatilization, migration or extraction even when subjected to high temperatures for prolonged periods of time. This feature makes these stabilized polymers especially attractive in food grade applications, for blending with thermoplastics processed at high temperatures or in automotive coatings where many of the commercial additives are lost during the bake cycle.

The polymers of this invention can be used by themselves as stabilized compositions or they may be blended with other polymers to form stabilized blends. When blending with other polymers or copolymers, it is advantageous to try to match the polymer backbone of the anhydride containing copolymer with the polymer or copolymer to be stabilized. For example, better results are obtained when stabilizing polypropylene if the hindered amine light stabilizer groups (G) are attached to an olefin (e.g., octadecene)-maleic anhydride copolymer rather than a styrene-maleic anhydride copolymer. Likewise, the styrene-maleic anhydride copolymers are often more suitable for attachment of the stabilizer group when stabilizing styrenics.

Concentrates of the polymer bound hindered amine light stabilizers in other polymers can be used as masterbatches to stabilize other polymer systems. For example, masterbatches of Dylark® resins containing the attached hindered amine light stabilizers in polystyrene may be blended with poly(phenylene oxide) or poly(-phenylene oxide)polystyene blends to stabilize them against thermal and photochemical degradation.

The amount of concentrate required will depend on the concentration of stabilizer group attached, additional additives present, the particular polymer system to be stabilized, and the degree of stabilization desired. Optimization of these variables can be easily accomplished.

In general, it is advisable to have about 0.01 to 5% by weight of the active stabilizer group (G group) in the final polymer or polymer blend. A preferred range is from about 0.05 to about 2% by weight. More preferred is the range from about 0.1 to about 1% by weight of the final polymer composition.

At times it may be beneficial to add extraneous additives which will act as synergists with the polymer-bound hindered amine light stabilizer groups. Synergistic systems applicable to this invention would include combinations of the polymer bound stabilizers with one or more of the following stabilizer co-synergists:

(1) 2-(2-hydroxyphenyl)-2-H-benzotriazoles (U.S. Pat. No. 4,481,315)
(2) 2-hydroxybenenzophenones (U.S. Pat. No. 4,481,315)
(3) hindered phenols
(4) phenyl salicylates or hydroxybenzoate esters (Japanese Pat. No. 77/127,954 CA 88 122192b)
(5) alkylmercaptopropionyl hydrazine derivatives (U.S. Pat. No. 4,469,828)
(6) aryl and alkyl phosphites If higher levels of stabilizers are attached to the anhydride polymer or copolymer, the modified polymer or copolymer may be used as a stabilizer concentrate and may be blended with additional anhydride polymer or copolymer or with other polymers or copolymers. Examples of such polymers and copolymers which may be stabilized by these stabilizer concentrates can be any polymeric material that is blendable with the starting anhydride copolymer backbone and include (1) Polyolefins such as high, low and linear low density polyethylene, which may be optionally crosslinked, polypropylene, polyisobutylene, poly(methylbutene-1), polyacetylene and in general polyolefins derived from monomers having from two to about ten carbon atoms and mixtures thereof.

(2) Polyolefins derived from diolefins such as polybutadiene and polyisoprene.

(3) Copolymers of mono or diolefins such as ethylene propylene, propylene-butene-1, propylene-isobutylene and ethylene-butene-1 copolymers.

(4) Terpolymers of ethylene and propylene with dienes (EPDM) such as butadiene, hexadiene, dicyclopentadiene and ethylidene nonbornene.

(5) Copolymers of a-olefins with acrylic or methacrylic acids or their derivatives such as ethylene-acrylic acid, ethylene-methyacrylic acid and ethylene-ethyl acrylate copolymers.

(6) Styrenic polymers such as polystyrene (PS) and poly(p-methylstyrene).

(7) Styrenic copolymers and terpolymers such as styrene-butadiene (SBR), styrene-allyl alcohol and styrene acrylonitrile (SAN), styrene-acrylonitrile-methacrylate-terpolymer, styrene-butadiene-styrene block copolymers (SBS), rubber modified styrenics such as styrene-acrylonitrile copolymers modified with acrylic ester polymers (ASA), graft copolymers of styrene on rubbers such as polybutadiene (HIPS), polyisoprene or styrene-butadiene-styrene block copolymers) (Stereon TM products available from Firestone Synthetic Rubber and Latex Co.), graft copolymers of styrene-acrylonitrile on rubbers such as butadiene (ABS), polyisoprene or styrene-butadiene-styrene block copolymers, graft copolymers of styrene-methyl methacrylate on rubbers such has polybutadiene (MBS), butadiene-styrene radial block copolymers (e.g., KRO 3 of Phillips Petroleum Co.), selectively hydrogenated butadiene-styrene block copolymers (e.g., Kraton G. from Shell) and mixtures thereof.

(8) Polymers and copolymers derived from halogen-containing vinyl monomers such as poly(vinyl chloride), poly(vinyl fluoride), poly(vinlidene chloride), poly(vinylidene fluoride), poly(tetrafluoroethylene) (PTFE), vinyl chloride-vinyl acetate copolymers, vinylidene chloride-vinyl acetate copolymers and ethylene-tetrafluoroethylene copolymers.

(9) Halogenated rubbers such as chlorinated and brominated butyl rubbers or polyolefins and fluoroelastomers.

(10) Polymers and copolymers derived from alpha, beta-unsaturated acids, anhydrides, esters, amides and nitriles or combinations thereof such as polymers or copolymers of acrylic and methacrylic acids, alkyl and/or glycidyl acrylates and methacrylates, acrylamide and methacrylamide, acrylontrile, maleic anhydride, maleimide, the various anhydride containing polymers and copolymers described in this disclosure, copolymers of the above polymers and various blends and mixtures thereof as well as rubber modified versions of the above polymers and copolymers.

(11) Polymers and copolymers derived from unsaturated alcohols or their acylated derivatives such as poly(vinyl alcohol), poly(vinyl acetate), poly(vinyl stearate), poly(vinylbenzoate), poly(vinyl maleate), poly(vinyl butyral), poly(allyl phthalate), poly(allyl diethylene glycol carbonate) (ADC), ethylene-vinyl acetate copolymer and ethylene-vinyl alcohol copolymers.

(12) Polymers and copolymers derived from unsaturated amines such as poly(allyl melamine).

(13) Polymers and copolymers derived from epoxides such as polyethylene oxide, polypropylene oxide and copolymers thereof as well as polymers derived from bis glycidyl ethers.

(14) Poly(phenylene oxides), poly(phenylene ethers) and modifications thereof containing grafted polystyrene or rubber as well as their various blends with polystyrene, rubber modified polystyrenes or nylon.

(15) Polycarbonates and especially the aromatic polycarbonates such as those derived from phosgene and bisphenols such as bisphenol-A, tetrabromobisphenol-A and tetramethylbisphenol-A.

(16) Polyesters derived from dicarboxylic acids and diols and/or hydroxycarboxylic acids or their corresponding lactones such as polyalkylene phthalates (e.g., polyethylene terephthalate (PET), polybutylene terephthalate (PBT) and poly(1,4-dimethylolcyclohexane terephthalate) or copolymers thereof and polylactones such as polycaprolactone).

(17) Polyarylates derived from bisphenols (e.g., bisphenol-A) and various aromatic acids such as isophthalic and terephthalic acids or mixtures thereof.

(18) Aromatic copolyesterocarbonates having carbonate as well as ester linkages present in the backbone of the polymer such as those derived from bisphenols, iso and terephthaloyl chlorides and phosgene.

(19) Polyurethanes and polyureas.

(20) Polyacetals such as polyoxymethylenes and polyoxymethylenes which contain ethylene oxide as a comonomer.

(21) Polysulfones, polyethersulfones, and polyimidesulfones.

(22) Polyamides and copolyamides which are derived from diamines and dicarboxylic acids and/or from aminocarboxylic acids or the corresponding lactams such as the following nylons 6, 6/6, 6/10, 11 and 12.

(23) Polyimides, polyetherimides, polyamideimides and copolyetheresters.

(24) Cross-linked polymers which are derived from aldehydes on the one hand and from phenols, ureas and melamine on the other hand such as phenol-formaldehyde, ureaformaldehyde and melamine-formaldehyde resins.

(25) Alkyl resins such as glycerol-phthalic acid resins and mixtures thereof with melamine-formaldehyde resins.

(26) Unsaturated polyester resins which are derived from copolyesters of saturated and unsaturated dicarboxylic acids with polyhydric alcohols as well as from vinyl compounds as cross-linking agents and also the halogen-containing, flame resistant modifications thereof.

(27) Natural polymers such as natural rubber, cellulose as well as the chemically modified homologous derivatives thereof such as cellulose acetates, cellulose propionates, cellulose butyrates and the cellulose ethers such as methyl and ethyl cellulose.

In addition, the polymer bound stabilizers of this invention may be used to stabilize various combinations or blends of the above polymers or copolymers. They are particularly useful in the stabilization of polyolefins, acrylic coatings, styrenics, rubber modified styrenics, poly(phenylene oxides) and their various blends with styrenics, rubber-modified styrenics or nylon.

The polymer bound hindered amine light stabilizers of this invention can be used together with other additives to further enhance the properties of the finished polymer. Examples of other additives that can be used in conjunction with the stabilizers of this invention include other antioxidants such as alkylated monophenols, alkylated hydroquinones, hydroxylated thiodiphenyl ethers, alkylidenebis-phenols, hindered phenolic benzyl compounds, acylaminophenols, esters of 3-(3,5-di-t-butyl-4-hydroxyphenyl)propionic acid, esters of 3-(5-t-butyl-4-hydroxy-3-methylphenyl)propionic acid, 3-(3,5-di-t-butyl-4-hydroxyphenyl)propionic acid amides, other UV absorbers and light stabilizers such as 2-(2'-hydroxyphenyl)-2H-benzotriazoles, 2-hydroxybenzophenones, benzylidene malonate esters, esters of substituted or unsubstituted benzoic acids, diphenyl acrylates, nickel chelates, oxalic acid diamides, other hindered amine light stabilizers, other additives such as metal deactivators, phosphites and phosphonites, peroxide decomposers, fillers and reinforcing agents, plasticizers, lubricants, corrosion and rust inhibitors, emulsifiers, mold release agents, carbon black, pigments, fluorescent brighteners, both organic and inorganic flame retardants and nondripping agents, melt flow improvers and antistatic agents. Numerous examples of suitable additives of the above type are given in Canadian Pat. No. 1,190,038.

EXAMPLES

The following hydrazido substituted hindered amine light stabilizers were used in the preparation of the polymer bound hindered amine light stabilizers of the following examples:

A. N-(2,2,6,6-tetramethyl-4-piperidinyl)-N'-aminooxamide (MW 242.3),

B. N-(2,2,6,6-tetramethyl-4-piperidinyl)-N'-aminosuccinamide (MW 270),

C. N-(2,2,6,6-tetramethyl-4-piperidinyl)-N'-malonamide (MW 256),

D. N-(2,2,6,6-tetramethyl-4-piperidinyl)-N'-adipamide (MW 298),

E. N-(2,2,6,6-tetramethyl-4-piperidinyl)-N'-azelamide (MW 368),

F. beta-(2,2,6,6-tetramethyl-4-piperidinylamino)propionhydrazide (MW 242.4),

G. alpha-(2,2,6,6-tetramethyl-4-piperidinylamino)acetylhydrazide (MW 228.3),

H. N-(1-acetyl-2,2,6,6-tetramethyl-4-piperidinyl)-N'-aminooxamide (MW 284.3)

I. N-(2,2,6,6-tetramethyl-4-piperidinyl-N'-amino-N'-methyloxamide (MW 256.3),

J. 4-(2,2,6,6-tetramethyl-4-piperidinyl)semicarbazide (MW 214.3),

K. 2-methyl-3-[(2,2,6,6-tetramethyl-4-piperidinyl-)amino]propionhydrazide (MW 256.4), and L. 1,2,2,6,6-pentamethyl-4-piperidinyl, carbazate The hydrazido substituted hindered amine light stabilizers A, B, C, D, and E were prepared by the reaction of 4-amino-2,2,6,6-tetramethylpiperidine with ethyl oxalyl chloride, ethyl succinyl chloride, ethyl malonyl chloride, methyl adipoyl chloride and methyl azelaoyl chloride respectively, followed by hydrazinolysis of the resultant ester-amides. Reactant F was prepared by the addition of 4-amino-2,2,6,6-tetramethylpiperidine to methyl acrylate followed by hydrazinolysis of the resultant ester. Reactant K was prepared by a similar sequence using methyl methacrylate instead of methyl acrylate. Reactant G was prepared by reacting 4-amino-2,2,6,6-tetramethylpiperidine with ethyl chloroacetate followed by hydrazinolysis of the ester. Reactant H was prepared by acylating the intermediate product from the reaction of ethyl oxalyl chloride with 4-amino-2,2,6,6-tetramethylpiperidine with acetyl chloride followed by hydrazinolysis of the ester in methanol. Reactant I was prepared by treating the product of the reaction of ethyl oxalyl chloride (or diethyl oxalate) with 4-amino-2,2,6,6-tetramethylpiperidine with methylhydrazine in methanol. Reactant J was prepared by reacting phenyl chloroformate with 4-amino-2,2,6,6-tetramethylpiperidine followed by hydrazinolysis of the resultant carbamate. Reactant L was prepared by reacting 1,2,2,6,6-pentamethyl-4-piperidinol with phenyl chloroformate followed by hydrazinolysis of the resultant carbonate.

The Jeffamines are polyoxyalkyleneamines available from Texaco Chemical Company. Jeffamine M-360 is a mixed propylene oxide-ethylene oxide based monoamino terminated polyol of approximately 360 molecular weight. Jeffamine 600 is a predominately propylene oxide based monoamino terminated polyol of approximately 600 molecular weight.

The following maleic anhydride copolymers were used in the preparation of the polymer bound stabilizers found in the examples:

SMA TM 1000 is a low molecular weight alternating copolymer of styrene and maleic anhydride with number average molecular weight of approximately 1600.

SMA TM 3000 is a low molecular weight copolymer of styrene and maleic anhydride containing approximately 3 styrene units for each maleic anhydride unit and has a number average molecular weight of approximately 1900. These SMA resins are products of the Arco Chemical Company.

EMA-1103 is an alternating ethylene-maleic anhydride copolymer and was obtained from the Monsanto Chemical Co.

Cadon resins are a commercial series of styrene-maleic anhydride polymer alloys with ABS and were obtained from the Monsanto Chemical Co.

PA-18 is a copolymer of 1-octadecene and maleic anhydride and was obtained from Chevron Chemical Co. It has a molecular weight of about 50,000 and contains about 28% maleic anhydride.

Gantrez AN 119 is a methyl vinyl ether-maleic anhydride copolymer commercially available from GAF.

The Dylark TM resins are high molecular weight non-equimolar copolymers of styrene and maleic anhydride commercially available from Arco Chemical Company. Dylark TM 250 is rubber modified while Dylark TM 232 is not. Dylark TM 250 is prepared by polymerizing about 92% by weight styrene monomer and about 8% by weight maleic anhydride, in the presence of about 18 parts by weight Stereon TM Rubber 720 (Firestone Synthetic Rubber and Latex Co.) per 100 parts of combined styrene and maleic anhydride.

EXAMPLE I

Attachment of N-(2,2,6,6-tetramethyl-4-piperidinyl-N'-aminooxamide to Octadecene-Maleic Anhydride Copolymer Into a 1.5 liter jacketed reactor were added 18.15 g of PA-18 (octadecene-maleic anhydride copolymer) and 200 grams of xylene. The reactor was equipped with a Teflon mechanical stirrer, Dean Stark trap and reflux condenser, thermometer and nitrogen sparge. The mixture was heated to reflux by circulating hot oil through the reactor jacket while passing nitrogen through the hot solution. To the hot solution was slowly added 10.0 grams (0.04 mole) of N-(2,2,6,6-tetramethyl-4-piperidinyl)-N'-aminooxamide (Reactive Stabilizer A). The neck of the flask was rinsed down with an additional 80 grams of xylene and the reaction mixture azeotroped for 2½ hours. A small sample of the solution was withdrawn at this point and placed on infrared (IR) salt plates and an IR scan run. The IR scan showed the anhydride band at 1780 $cm^{-1}$ has been almost completely converted to an imide band at 1740 $cm^{-1}$ indicating the reaction was essentially completed. The reaction mixture was cooled and discharged into a liter of methanol. A white precipitate formed. The white precipitate was filtered off, washed with fresh methanol, and dried in a vacuum oven at 50° C. overnight.

EXAMPLE II

Attachment of 3-(2,2,6,6-tetramethyl-4-piperidinylamino)propionhydrazide to Octadecene-Maleic Anhydride Copolymer Into a 500 ml 3-neck round bottom flask was added 80 grams of xylene. The flask was equipped with a magnetic stirrer, thermometer, nitrogen sparge, Dean Stark trap, and reflux condenser. The flask was placed in an oil bath and warmed to about 80° C. Then 10.3 grams of PA-18 (octadecene-maleic anhydride copolymer) were added and the mixture was heated to 130° C. to dissolve the polymer. To the hot solution was slowly added 6.0 grams (0.024 mole) of 95% 3-(2,2,6,6-tetramethyl-4-piperidinylamino)propionhydrazide (Reactive Stabilizer F). The reaction was sparged with nitrogen and the neck of the flask rinsed down with an additional 30 grams of xylene. The reaction mixture was heated to reflux and azeotroped for 2 hours. The reaction was monitored by withdrawing small samples of the solution and following the conversion of the anhydride band at 1780 $cm^{-1}$ to the imide band at 1740 $cm^{-1}$. Reaction was completed during the two hour period and the solution was cooled and precipitated into a liter of methanol. The precipitated polymer was filtered, washed with fresh methanol, and dried in a vacuum oven at 50° C. overnight. The dry product weighed 12.13 g.

EXAMPLES III TO XI

Attachment of Hydrazido Substituted Hindered Amine Light Stabilizers to Maleic Anhydride Copolymers In these examples (in Table I), the indicated equivalents of copolymer (based on maleic anhydride) were weighted into a 250 ml 3-neck flask. The flask was equipped with a Dean-Stark trap containing a water cooled reflux condenser, a magnetic stirring bar, thermometer, and ground glass stopper. Approximately 130–150 ml of xylene were added to the flask and the flask was heated in an oil bath to 120°–140° C. The particular HALS hydrazide was slowly added in the indicated amount (see Table I) over 2–5 minutes by momentarily removing the stopper and adding small portions of the hydrazide in short intervals. The reaction mixture was then heated to reflux and the xylene azetroped for 1–5 hours depending on the reactivity of the particular hydrazide. The reaction was monitored by following the water that azeotroped over in the Dean-Stark trap and by periodically withdrawing samples of the reaction mixture and running infrared spectra on the samples. The conversion of the anhydride peak of the copolymer at 1780 $cm^{-1}$ to the imide peak around 1730–1740 $cm^{-1}$ indicated qualitatively the extent of reaction. After the reflux period was completed, the reaction mixture was cooled below 90° C. If the product was insoluble in the hot xylene, the mixture was filtered; the filter cake was washed with hexane (SMAs) or methanol (PA-18) and air dried on a watch glass. If the product was soluble or partially soluble in the xylene, the xylene was stripped off on a rotary evaporator under reduced pressure. The last portion of xylene was driven off by heating the flask with a heat gun. Upon completion of the stripping, the product was scraped out of the flask and pulverized in a mortar with a pestle. The pulverized product was then dried to a constant weight on a watch glass.

Tg's were determined in some cases on a Perkin Elmer 7 Series Thermal Analysis System DSC using a nitrogen purge and heating at a rate of 20° C./minute.

EXAMPLES XII TO XIV

Attachment of Hydrazido Substituted Hindered Amine Light Stabilizers to Dylark TM SMA Copolymers In these examples (in Table I), the indicated equivalents of a Dylark TM SMA copolymer were slowly added to a hot solution xylene (130 ml) in a 3-neck 250 ml flask. The flask was equipped with a Dean-Stark trap containing a water cooled reflux condenser, a magnetic stirring bar, thermometer, and ground glass stopper. After all the Dylark had dissolved in the hot solution, the indicated amounts of Jeffamine M-360, if any, were added and allowed to react 15 minutes before adding the indicated HALS hydrazide. In both cases where the Jeffamine M-360 was added, the polymer remained in solution and there was a reduction in the infrared peak at 1780 $cm^{-1}$ (anhydride) and the formation of an imide peak at 1740 $cm^{-1}$. Upon addition of HALS hydrazides A or G the reaction mixture immediately gelled up while the polymer remained in solution upon addition of the acetylated HALS hydrazide H. All the reactions were refluxed for 2 hours after the addition of the HALS hydrazide, cooled below 50° C. and precipitated into 1 to 1½ liters of methanol. The methanol-xylene solution was decanted off and the polymer was ground up in 300 ml of fresh methanol in a Waring blender. The polymer was filtered off and air dried on a watch glass overnight. An infrared scan was run on the product to insure the anhydride portion of the copolymer had reacted with the hydrazide portion of the hindered amine light stabilizer.

EXAMPLES XV TO XXV

Attachment of Hydrazido Substituted Hindered Amine Light Stabilizers to Octadecene-Maleic Anhydride Copolymer (PA-18)

Examples XV to XXV (See Table I) were run similar to Example I except the reactor size and amount of xylene used varied with the reaction scale. The PA-18 was diluted with xylene and heated to 120° C. or above. The HALS hydrazide was slowly added to the PA-18 solution by removing the reactor stopper temporarily and adding the hydrazide in small portions. the Hydrazide rapidly reacts with the PA-18 to form the amic acid and then converts over to the imide at a slower rate above 120° C. If the hydrazide is added too quickly or all at once, it forms a very viscous gel of the relatively insoluble amic acid and stirring becomes difficult or impossible. Therefore, it is wise to add the hydrazide over a period of time allowing most of the amic acid that forms to convert over to the imide before adding more hydrazide. The imidization can be monitored by the water that azeotropes over. After the hydrazide addition and the imidization were completed (no more water azeotroping), the xylene solution was cooled below 90° C. The product was isolated by evaporating off the xylene on a rotating evaporator under reduced pressure or by precipitating the product out of the xylene by the addition of 4–5 volumes of methanol and filtering off the precipitated polymer.

In Examples XXIII to XXV a portion of the PA-18 was partially reacted with a Jeffamine or dodecylamine to lower the melting point of the copolymer and increase its compatibility in polyolefin copolymers. The reactions were carried out in the same manner except a portion of the HALS hydrazide was replaced by an equivalent amount of amine.

TABLE I

ATTACHMENT OF HALS HYDRAZIDES TO MALEIIDE COPOLYMERS

| EXAMPLE | HALS HYDRAZIDE | MOLES | SUPPLEMENTAL AMINE*** | MOLES | MA COPOLYMER | MOLES | HOURS AZEOTROPE |
|---|---|---|---|---|---|---|---|
| III | A | .030 | | | SMA 3000 | .033 | 3.0 |
| IV,* | A | .018 | | | SMA 1000 | .020 | 4.5 |
| V | G | .040 | | | SMA 3000 | .045 | 2.0 |
| VI | C | .037 | | | SMA 3000 | .040 | 2.0 |
| VII | B | .020 | | | SMA 3000 | .020 | 2.0 |
| VIII | D | .030 | | | SMA 3000 | .033 | 2.0 |
| IX | E | .030 | | | SMA 3000 | .033 | 2.0 |
| X | I | .030 | | | SMA 3000 | .033 | 3.0 |
| XI | F | .030 | | | SMA 3000 | .033 | 3.5 |
| XII | A | .010 | 1 | .01 | DYLARK 232 | .020 | 2.0 |
| XIII | H | .010 | 1 | .01 | DYLARK 232 | .020 | 2.0 |
| XIV,** | G | .015 | | | DYLARK 250 | .020 | 2.0 |
| XV | G | .015 | | | PA-18 | .020 | 3.0 |
| XVI | D | .015 | | | PA-18 | .020 | 1.5 |
| XVII | J | .035 | | | PA-18 | .040 | 1.5 |
| XVIII | H | .030 | | | PA-18 | .050 | 2.0 |
| XIX | K | .011 | | | PA-18 | .014 | 2.0 |
| XX | L | .023 | | | PA-18 | .029 | 1.0 |
| XXI | B | .050 | | | PA-18 | .062 | 4.0 |
| XXII | A | .130 | | | PA-18 | .130 | 4.5 |
| XXIII | A | .078 | 2 | .026 | PA-18 | .130 | 2.0 |
| XXIV | A | .091 | 2 | .013 | PA-18 | .130 | 3.0 |

TABLE I-continued

| ATTACHMENT OF HALS HYDRAZIDES TO MALEIIDE COPOLYMERS | | | | | | | | | |
|---|---|---|---|---|---|---|---|---|---|
| XXV | A | .080 | 1 | | | PA-18 | .200 | | 2.0 |
| | | | PRODUCT ISOLATED by method, grams, Tg (key below) | | | | INFRARED SPECTRAL DATA cm, (key below) | | |
| | | EXAMPLE | FILTER | EVAP | PPTN | Tg, C | ANHYD | IMIDE | AMIDE |
| | | III | 18.7 | 1.2 | | 186.6 | 1780,W | 1735,S | 1675,S |
| | | IV,* | 5.0 | | | | 1780,S | 1735,M | 1675,M |
| | | V | 16.0 | 2.6 | | | 1780,VW | 1725,VS | |
| | | VI | 16.8 | .3 | | | 1780,W | 1725,SB | 1660,MB |
| | | VII | 12.8 | 1.5 | | 171.6 | 1780,W | 1730,S | 1660,M |
| | | VIII | | 21.8 | | 156.6 | 1780,W | 1730,S | 1650,M |
| | | IX | | 22.4 | | 137.9 | 1780,W | 1740,S | 1660,M |
| | | X | 18.5 | 2.6 | | | 1780,W | 1730,M | 1660,S |
| | | XI | 16.3 | | | | 1780,W | 1720,S | 1670,M |
| | | XII | | | 24.2 | 101.3 | 1780,W | 1730,S | 1660,M |
| | | XIII | | | 22.7 | 92.0 | 1780,W | 1730,S | 1600,M |
| | | XIV,** | | | 11.0 | | 1780,VW | 1730,VS | |
| | | XV | | 10.4 | | | 1780,VW | 1730,VS | |
| | | XVI | | 10.0 | | 124.0 | 1780,VW | 1730,S | 1650,M |
| | | XVII | | 19.0 | | 136.7 | 1780,W | 1700,VSB | |
| | | XVIII | | 27.3 | | | 1780,W | 1730,S | 1680,M |
| | | XIX | | 7.0 | | | 1780,W | 1725,VS | 1620,W |
| | | XX | | | 12.5 | | 1780,W | 1725,VS | |
| | | XXI | | 31.1 | | | 1780,VW | 1725,VS | 1605,M |
| | | XXII | | | 66.3 | | 1780,VW | 1730,S | 1670,M |
| | | XXIII | | | 62.4 | | 1780,VW | 1730,S | 1670,M |
| | | XXIV | | | 64.4 | | 1780,VW | 1730,S | 1670,M |
| | | XXV | | | 106.0 | | 1780,VW | 1730,S | 1670,M |

Product Isolation: FILTER = by filtration, EVAP = by solvent evaporation, PPTN = by precipitation in methanol
IR Spectra: B = broad, M = medium, S = strong, V = very, W = weak
*The hydrazide only attached to about ½ of the anhydride groups under the reaction conditions.
**Yield was low due to some product caking on the reactor sides and scorching, scorched material was discarded
***1 is Jeffamine M-360, 2 is dodecylamine

EXAMPLE XXVI

Attachment of N-(2,2,6,6-tetramethyl-4-piperidinyl)-N'-aminosuccinamide to Ethylene-Maleic Anhydride Copolymer Into a 250 ml 3-neck flask were added 4.12 grams (~0.0327 equivalent) of Monsanto's EMA-1103 (ethylene-maleic acid anhydride copolymer) and 130 mls of xylene. The flask was equipped with a magnetic stirrer, thermometer, Dean-Stark trap, reflux condenser, and ground glass stopper. The flask was heated in an oil bath and 5.4 grams of N-(2,2,6,6-tetramethyl-4-piperidinyl)-N'-aminosuccinamide (Reactive Stabilizer B) added over a few minutes by momentarily removing the stopper and adding small portions of the hydrazide in short intervals. The reaction mixture was then heated to reflux and the xylene azeotroped for 1½ hours. The reaction flask was removed from the oil bath and cooled to 100° C.; and the xylene insolubles were filtered off. The filter cake was slurried in 200 ml of hexane to remove residual xylene, filtered, and air dried on a watch glass overnight. The dry product weighted 8.7 grams. A sample of the product was scanned on the FTIR before and after heating to 250° C. on a thermal gravimetric analyzer. The IR scan taken before heating to 250° C. had a small anhydride band at 1780 $cm^{-1}$ and a strong band at 1620 $cm^{-1}$; the sample that was heated to 250° C. in nitrogen had a strong imide band at 1740 $cm^{-1}$, a weak band at 1700 $cm^{-1}$ and a weak anhydride band at 1780 $cm^{-1}$. The FTIR scans indicate that the isolated product was in the amic acid form and upon heating to 250° C. it cyclized to the imide form with the loss of water.

EXAMPLE XXVII

Attachment of a Hydrazido Substituted Hindered Amine Light Stabilizers to a Maleic Anhydride Copolymer in a Melt-Blending Procedure To a Brabender Prep Center Mixer operating at 190°-200° C. and 30 RPM was added 200 grams of Dylark TM 232. The Dylark TM 232 was heated in the mixer and when the polymer temperature reached 220° C., 25 grams (0.1 mole) of HALS hydrazide A were added over 5 minutes. There was a constant stream of vapor ($H_2O$) given off during the addition. The hydrazide was added over a temperature range of 220°-225° C. and then mixed for an additional 5 minutes. During the mixing period the temperature rose to 238° C. The modified copolymer was removed from the mixer, cooled and ground up in a grinder. The polymer took on a light tan color due to some exposure to air at the high temperatures. A 0.5 gram sample of the product was dissolved in chloroform and an IR scan was run on the solution. The anhydride band at 1780 $cm^{-1}$ was about ½ as intense as the imide band that formed at 1735 $cm^{-1}$ and about ⅔ as intense as the amide band at 1690 $cm^{-1}$.

The reaction was repeated only this time the Dylark TM 232 was heated to 235° C. before adding the HALS hydrazide A. The hydrazide was added over as temperature range of 235°-241° C. and the temperature reached 250° C. during the 5 minute mixing period. The modified Dylark TM was removed from the mixer, cooled and ground up as before. The polymer was slightly darker in color due to the higher temperatures it was exposed to. A 0.5 gram sample of the product was dissolved in chloroform and an IR scan run on the solution. The anhyidride, imide and amide bands had similar intensities as in the previous run indicating no further reaction had occurred at the higher temperature and complete reaction was obtained in the first run at 220°-238° C.

EXAMPLE XXVIII

Attachment of a Hydrazido Substituted Hindered Amine Light Stabilizer to a Maleic Anhydride Copolymer in an Extruder A blend of 500 grams of Dylark TM 232 and 65 grams of HALS hydrazide A was prepared by shaking the two components in a gallon jug. The blend was then extruded at 215°-220° C. in a Brabender Prep Center Extruder at 30 RPM. Foaming of the extrudate occurred at the die head due to entrapped water vapor. The extrudate was air cooled with a fan, ground up in a grinder and reextruded at 220° C. After the second extrusion the resin was clear and had taken on a slight pale yellow color. During the extrusion the pressure in the extruder increased from 260 p.s.i. to 760 p.s.i. due to the higher melt viscosity of the modified resin. A sample of the extrudate was dissolved in chloroform. Most of the sample dissolved but there was some insoluble gel. An FTIR scan of the solution had a strong carbonyl band at 1780 $cm^{-1}$ (anhydride), a slightly weaker band at 1740 $cm^{-1}$ (imide), and a weaker band at 1690 $cm^{-1}$ (amide). An FTIR scan of the insoluble gel showed the same three bands but the imide band at 1740 $cm^{-1}$ was much stronger than the anhydride band at 1780 $cm^{-1}$.

300 grams of the extrudate was reextruded at 260° C. The pressure on the die head of the extruder decreased significantly as the extrusion temperature increased. A 0.5 g sample of each extrudate was dissolved in 20 ml of warm chloroform. Each solution was a little cloudy. The viscosity of the solutions decreased as the temperature of the extrusion increased. IR scans of the solutions were all similar. There was an anhydride band at 1775 $cm^{-1}$, a much stronger imide band at 1730 $cm^{-1}$, and an amide band at 1685 $cm^{-1}$ about as intense as the anhydride band.

EXAMPLE XXIX

Attachment of a Hydrazido Substituted Hindered Amine Light Stabilizer to an Octadecene-Maleic Anhydride Copolymer in an Extruder The reaction was carried out in a Brabender Prep Center Extruder Model No. 1340 having a 1¼ inch screw diameter with a length to diameter ratio of 25:1. A vent was attached to the barrel which was connected to a vacuum pump through a vacuum trap. The extruder was operated at a screw speed of 30 rpm and the following temperature profile was employed:

Zone One: 150° C.
Zone Two: 190° C.
Zone Three: 220° C.
Zone Four: 220° C.
Die: 225° C.

A blend of 177.6 g (0.73 mole) of HALS hydrazide A, 322.5 (0.92 equivalent) of PA-18, and 1.60 grams of Irganox 1076 antioxidant (Ciba-Geigy) was prepared by dry mixing the three components in a glass jar. The blend was added to the extruder hopper and conveyed through the extruder. The first 100 grams of extrudate were used to purge out the extruder and were discarded. The remaining extrudate was air cooled and ground up. During the extrusion water vapor formed both in the trap and at the die head. The extrudate was a light weight foamed product which could easily be crushed by hand into a fine free flowing powder. An IR scan of the extrudate contained a very weak carbonyl band at 1780 $cm^{-1}$ and strong carbonyl bands at 1730 $cm^{-1}$ and 1670 $cm^{-1}$. The IR scan was similar to the IR scan of the product prepared in xylene in Example I.

EXAMPLE XXX

Attachment of a Hydrazido Substituted Hindered Amine Light Stabilizer to a Maleic Anhydride Copolymer in an Extruder A blend of 1 kg of Dylark TM 250 and 130 grams of HALS hydrazide A was prepared by shaking the components in a gallon jug. The blend was then extruded at 215°-220° C. in a Brabender Prep Center Vented Extruder. The vent was used on the extruder to remove the water vapor generated by the reaction occurring during the extrusion. The extrudate contained some bubbles or blisters due to incomplete removal of the water vapor. The extrudate was air cooled with a fan, ground up in a grinder, and reextruded at 220° C. During the extrusion the pressure increased from 260 p.s.i. to 1000 p.s.i. due to the higher melt viscosity of the modified resin.

300 grams of the extrudate were dried for 2 hours at 95° C. and reextruded at 240° C., ground up, sampled and reextruded at 260° C. The pressure on the die head of the extruder decreased significantly as the extrusion temperature increased. A 0.5 g sample of each extrudate was dissolved in 20 ml of warm chloroform. Each solution was cloudy. The solution containing the modified Dylark TM 250 extruded at 220° C. contained some insoluble solids and was quite viscous. The viscosity decreased and the number of insoluble solids decreased as the extrusion temperature of the modified Dylark TM 250 increased. IR scans of the solutions were all similar. There was a weak anhydride band at 1775 $cm^{-1}$, a strong imide band at 1730 $cm^{-1}$, and an amide band at

TABLE II

| | Polypropylene Formulations Prepared in Extruder (Example XXIII) | | | | | | | |
|---|---|---|---|---|---|---|---|---|
| Formulation # | 1 | 2 | 3 | 4 | 5 | 6 | 7 | 8 |
| Hinmont 6501 Polypropylene (g) | 1095.6 | 1095.6 | 1087.6 | 1093.8 | 1096.9 | 864 | 1086.5 | 1087.4 |
| Chimassorb 944 LD (g) | 4.40 | — | — | — | — | — | — | — |
| Tinuvin 770 (g) | — | 4.40 | — | — | — | — | — | — |
| Irganox 1076 (g) | 2.75 | 2.75 | 2.75 | 2.75 | 2.75 | 2.2 | 2.75 | 2.75 |
| HALS-PA-18 Adduct From Ex I (g) | — | — | 12.39 | 6.2 | 3.1 | — | — | — |
| HALS-PA-18 Adduct From Ex II (g) | | | | | | 10.0 | | |
| HALS-PA-18 Adduct From Ex XIV (g) | | | | | | | | 12.6 |
| HALS-PA-18 Adduct From Ex XV (g) | | | | | | | 13.5 | |
| *Concentration of HALS Moiety | 0.4% | 0.4% | 0.4% | 0.2% | 0.1% | 0.4% | 0.4 | 0.4% |

Chimassorb 944 LD is a polymeric Hindered Amine Light Stabilizer (HALS) and is a commercial product of Ciba-Geigy.
Tinuvin 770 is another commercial product of Ciba-Geigy.
Irganox 1076 is a hindered phenol antioxidant and is a product of Ciba-Geigy.

1685 $cm^{-1}$ that was twice as intense as the anhydride band.

EXAMPLE XXXI

Evaluation of Polymer Bound Hindered Amine Light Stabilizers in the Stabilization of Polypropylene The various stabilizers were dry mixed with Himont's Profax 6501 polypropylene (see Table II) and extruded in a Brabender Prep Center Extruder at 200° C. and 30 RPM. To insure uniformity the extrudate was pelletized and reextruded. The reextruded resin was pelletized and injection molded in a Newbury 25 ton injection molding machine at 400° F. into 7⅜"×¾"×⅛" tensile bars. The tensile bars were placed in a QUV Accelerated Weathering Tester (Q Panel Company) for various exposure times. The QUV operated with an 8 hour light cycle (UV-B) at 60° C. and a 4 hour condensation cycle at 50° C. Samples withdrawn from the QUV were evaluated for change in yellowing (ΔYID) on a Colorgard System/05 (Pacific Scientific) colorimeter. Tensile properties before and after exposure were determined on an Instron (see Table III for results). Tensile bars were also weathered in an Atlas ((Ci 65 Xenon Arc) Weatherometer and evaluated before and after exposure in the same manner. Cam cycle #180 was employed in the weatherometer. This provides 2 hours light and 1 hour dark. The light cycle used borosilicate inner/outer filter systems and an irradiance of 0.38 $w/m^2$ at 340 nm. The black panel temperature was 70° C. (160° F.) with a relative humidity of 50%. The dark cycle had a temperature of 38° C. and a relative humidity of 100%±5%. The light cycle provided 40 minutes of light followed by 20 minutes of light and front specimen spray followed by 60 minutes of light. The results are summarized in Table III.

TABLE III

STABILIZATION OF POLYPROPYLENE WITH HINDERED AMINE LIGHT STABILIZERS

| FORMULATION | 1 | | | | 2 | | | |
|---|---|---|---|---|---|---|---|---|
| QUV EXPOSURE, hours | 0 | 250 | 500 | 750 | 0 | 250 | 500 | 750 |
| YELLOWNESS INDEX | | | | | | | | |
| YELLOWNESS CHANGE (Δ YID) | 0 | 13.8 | 16.5 | 27.7 | 0 | 17.8 | 13.4 | 18.4 |
| YIELD STRENGTH (psi) | 4600 | 4800 | 4850 | 1700 | 4600 | 4900 | 4900 | 3300 |
| TENSILE AT BREAK (psi) | 2800 | 2900 | 2700 | 1700 | 2800 | 2800 | 2500 | 3300 |
| TENSILE MODULUS (× $10^{-3}$) | 179 | 166 | 167 | 172 | 174 | 173 | 171 | 178 |
| % ELONGATION | 470 | 95 | 18 | 0 | 230 | 58 | 23 | 5 |
| WEATHER-O-METER, hours | 0 | 350 | 660 | 1200 | 0 | 350 | 660 | 1200 |
| YELLOWNESS INDEX | −39.9 | | | | −39.5 | | | |
| YELLOWNESS CHANGE (Δ YID) | 0 | 2.1 | 3.8 | 3.9 | 0 | 8.6 | 1.6 | 11.5 |
| YIELD STRENGTH (psi) | 4600 | 4800 | 4800 | 5000 | 4600 | 4900 | 4800 | 5100 |
| TENSILE AT BREAK (psi) | 2800 | 2900 | 2900 | 2900 | 2800 | 2900 | 2900 | 2700 |
| TENSILE MODULUS (× $10^{-3}$) | 179 | 181 | 172 | 193 | 174 | 186 | 167 | 207 |
| % ELONGATION | 470 | 116 | 121 | 77 | 230 | 82 | 83 | 23 |
| FORMULATION | 3 | | | | 4 | | | |
| QUV EXPOSURE, hours | 0 | 250 | 500 | 750 | 0 | 250 | 500 | 750 |
| YELLOWNESS INDEX | | | | | | | | |
| YELLOWNESS CHANGE (Δ YID) | 0 | 8.7 | 11.4 | 25.1 | 0 | 7.6 | 16.1 | 24 |
| YIELD STRENGTH (psi) | 4600 | 4900 | 4800 | 3900 | 4700 | 4900 | 4100 | 3800 |
| TENSILE AT BREAK (psi) | 2400 | 2700 | 4000 | 3900 | 2900 | 2800 | 4100 | 3700 |
| TENSILE MODULUS (× $10^{-3}$) | 176 | 178 | 179 | 162 | 178 | 177 | 174 | 150 |
| % ELONGATION | 290 | 100 | 36 | 13 | 250 | 87 | 20 | 14 |
| WEATHER-O-METER, hours | 0 | 350 | 660 | 1200 | 0 | 350 | 660 | 1200 |
| YELLOWNESS INDEX | −34.7 | | | | −35.6 | | | |
| YELLOWNESS CHANGE (Δ YID) | 0 | 6.4 | −.3 | 2.8 | 0 | 5.4 | −.8 | 3.4 |
| YIELD STRENGTH (psi) | 4600 | 4900 | 4800 | 5100 | 4700 | 4900 | 4800 | 5100 |
| TENSILE AT BREAK (psi) | 2400 | 2800 | 2700 | 2600 | 2900 | 3000 | 2900 | 2600 |
| TENSILE MODULUS (× $10^{-3}$) | 176 | 189 | 170 | 200 | 178 | 185 | 173 | 195 |
| % ELONGATION | 290 | 141 | 122 | 78 | 250 | 128 | 81 | 56 |
| FORMULATION | 5 | | | | 6 | | | |
| QUV EXPOSURE, hours | 0 | 250 | 500 | 750 | 0 | 250 | 500 | 750 |
| YELLOWNESS INDEX | | | | | 27.2 | 33.5 | 27.6 | |
| YELLOWNESS CHANGE (Δ YID) | 0 | 7.1 | 18.2 | 29.8 | 0 | 6.4 | 0.4 | |
| YIELD STRENGTH (psi) | 4600 | 4900 | 4200 | 3800 | | | | |
| TENSILE AT BREAK (psi) | 2900 | 2800 | 4100 | 3700 | | | | |
| TENSILE MODULUS (× $10^{-3}$) | 182 | 175 | 165 | 150 | | | | |
| % ELONGATION | 330 | 93 | 21 | 15 | 192 | 106 | 6.2 | |
| WEATHER-O-METER, hours | 0 | 350 | 660 | 1200 | 0 | 350 | 660 | 1200 |
| YELLOWNESS INDEX | −38 | | | | −24.5 | | | |
| YELLOWNESS CHANGE (Δ YID) | 0 | 3.9 | .3 | 4.1 | 0 | −2.6 | −4.9 | −11.3 |
| YIELD STRENGTH (psi) | 4600 | 4900 | 4800 | 5000 | 4400 | 5200 | 5100 | 5300 |
| TENSILE AT BREAK (psi) | 2900 | 2900 | 2900 | 2900 | 2800 | 2900 | 2900 | 3000 |
| TENSILE MODULUS (× $10^{-3}$) | 182 | 187 | 165 | 187 | 170 | 205 | 200 | 208 |
| % ELONGATION | 300 | 90 | 64 | 54 | 325 | 83 | 51 | 50 |
| FORMULATION | 7 | | | | 8 | | | |
| QUV EXPOSURE, hours | 0 | 250 | 500 | 750 | 0 | 250 | 500 | 750 |
| YELLOWNESS INDEX | 23.8 | 30.8 | 30.4 | | 29.2 | 24.3 | 24.9 | |
| YELLOWNESS CHANGE (Δ YID) | | 6.9 | 6.6 | | | −5.0 | −4.3 | |
| YIELD STRENGTH (psi) | | | | | | | | |
| TENSILE AT BREAK (psi) | | | | | | | | |
| TENSILE MODULUS (× $10^{-3}$) | | | | | | | | |
| % ELONGATION | 164 | 32 | 12 | | 196 | 98 | 8 | |
| WEATHER-O-METER, hours | 0 | 350 | 660 | 1200 | 0 | 350 | 660 | 1200 |

TABLE III-continued

| STABILIZATION OF POLYPROPYLENE WITH HINDERED AMINE LIGHT STABILIZERS |
|---|
| YELLOWNESS INDEX |
| YELLOWNESS CHANGE (Δ YID) |
| YIELD STRENGTH (psi) |
| TENSILE AT BREAK (psi) |
| TENSILE MODULUS ($\times 10^{-3}$) |
| % ELONGATION |

EXAMPLES XXXII to XLVII

Evaluation of Polymer Bound Hindered Amine Light Stabilizers in the Stabilization of Polypropylene The various polymer bound stabilizers were dry mixed with Himont's Profax 6501 polypropylene and optionally a small amount of a hindered phenol antioxidant (Ciba-Geigy's Irganox 1076) in a polyethylene container. In some cases a small amount of a phosphite stabilizer was also added. The blends were shaken well to insure a good dispersion of the additives in the polypropylene. The blends were then extruded on a Brabender prep Center Extruder Model No. 1340. The extruder was operated at a screw speed of 30 RPM and all the heating zones were controlled at 220° C. Approximately the first 100 grams of extrudate were used to purge out the extruder and were discarded. The remaining extrudate was air cooled and passed through a pellitizer.

In Examples XXXII to XXXIX the blends were prepared at a masterbatch concentration of the polymer bound HALS. Therefore, 100 grams of the pelletized concentrate were let down further with more polypropylene to obtain the desired 0.3% concentration of the 2,2,6,6-tetramethyl-4-piperidinyl group. If an antioxidant was employed in the initial extrusion, enough Irganox 1076 was added to provide a 0.25% concentration. The blends were shaken well and reextruded at 22° C. and a screw speed of 30 RPM. Again the first 100 grams (±20 grams) of extrudate were discarded and the remainder was cooled and passed through a pelletizer. In Examples XL to XLVII the blend were prepared at the use level of 0.3% of the 2,2,6,6-tetramethyl-4-piperidinyl group and the initial extrudates did not have to be let down further.

The formulations are tabulated in Table IV. The final compositions were injection molded in a Newbury 25 ton injection molding machine at 400° F. into $7\frac{3}{8}'' \times \frac{3}{4}'' \times \frac{1}{8}''$ tensile bars.

The tensile bars from the various formulations were placed in a QUV (same conditions as Example XXXI) for various exposure times. Samples withdrawn from the QUV were evaluated to change in yellowing (ΔE) on the Colorgard System. After measuring the color, the tensile bars were either placed back in the QUV for further exposure or pulled on an Instron and the % elongation determined. By comparing the % elongation of the unexposed samples, the % retention of elongation was calculated for the indicated exposure period. The approximate number of days exposure required to give a brittle break on the Instron was also noted if possible. The tensile bars were also visually monitored to determine how long they survived in the QUV before the surface began to crack, chalk or craze. The results are tabulated in Table V.

TABLE IV

EXTRUSION OF POLYPROPYLENE WITH POLYMER BOUND HALS

| EXAMPLE # | HALS FROM EXAMPLE # | GRAMS HALS | GRAMS PP* | GRAMS IR 1076 ** | GRAMS TDP *** | GRAMS YIELD | GRAMS CONC | GRAMS ADDED PP |
|---|---|---|---|---|---|---|---|---|
| XXXII | XXII | 24.4 | 370 | 1.0 | | 323.6 | 100 | 400 |
| XXXIII | XXIX | 28.2 | 370 | | | 286.2 | 100 | 400 |
| XXXIV | XXIX | 28.2 | 370 | 1.0 | | 285.1 | 100 | 400 |
| XXXV | XXIX | 28.2 | 370 | 1.0 | | 303.6 | 100 | 400 |
| XXXVI | XXIX | 28.2 | 370 | 1.0 | 4.0 | 287.5 | 100 | 400 |
| XXXVII | XXIX | 28.0 | 370 | 1.0 | 2.0 | 288.7 | 100 | 400 |
| XXXVIII | XXI | 26.3 | 330 | 0.9 | | 276.9 | 100 | 400 |
| XXXIX | XX | 10.2 | 355 | 0.9 | | 255.6 | 200 | 200 |
| XL | XXII | 4.9 | 390 | | | | | |
| XLI | XXII | 4.9 | 390 | 1.0 | | | | |
| XLII | XXIX | 5.6 | 390 | | | | | |
| XLIII | XXIX | 5.6 | 390 | 1.0 | | | | |
| XLIV | XXIII | 7.4 | 390 | | | | | |
| XLV | XXIII | 7.4 | 390 | 1.0 | | | | |
| XLVI | XXIV | 6.4 | 390 | | | | | |
| XLVII | XXIV | 6.4 | 390 | 1.0 | | | | |
| C-1 | | | | | | | | 1000 |
| C-2 | T-770 | 10.0 | 1000 | 2.5 | | 874.0 | | 874 |

| EXAMPLE # | HALS FROM EXAMPLE # | GRAMS ADDED IR 1076 | GRAMS FINAL YIELD | FINAL IR 1076 CONC | FINAL HALS CONC |
|---|---|---|---|---|---|
| XXXII | XXII | 1.3 | 387.5 | .25 | 0.3 |
| XXXIII | XXIX | 1.3 | 348.8 | | 0.3 |
| XXXIV | XXIX | 1.3 | 388.4 | .25 | 0.3 |
| XXXV | XXIX | 1.3 | 371.71 | .25 | 0.3 |
| XXXVI | XXIX | 1.3 | 360.8 | .25 | 0.3 |
| XXXVII | XXIX | 1.3 | 322.7 | .25 | 0.3 |
| XXXVIII | XXI | 1.3 | 342.8 | .25 | 0.3 |
| XXXIX | XX | 1.1 | 277.3 | .25 | 0.3 |
| XL | XXII | | 291.1 | | 0.3 |
| XLI | XXII | | 312.1 | .25 | 0.3 |

TABLE IV-continued

EXTRUSION OF POLYPROPYLENE WITH POLYMER BOUND HALS

| | | | | | |
|---|---|---|---|---|---|
| XLII | XXIX | | 340.0 | | 0.3 |
| XLIII | XXIX | | 269.0 | .25 | 0.3 |
| XLIV | XXIII | | 309.0 | | 0.3 |
| XLV | XXIII | | 277.8 | .25 | 0.3 |
| XLVI | XXIV | | 287.5 | | |
| XLVII | XXIV | | 284.2 | .25 | |
| C-1 | | 2.5 | 860.0 | .25 | 0.0 |
| C-2 | T-770 | 4.4 | 1530 | .25 | 0.3 |

PP = Polypropylene
IR 1076 = Irganox 1076 (Ciba-Geigy)
TDP = tridecyl phosphate
T-770 = Tinuvin 770 (Ciba-Geigy)
C-1 = Control 1
C-2 = Control 2

TABLE V

STABILIZATION OF POLYPROPYLENE WITH POLYMER BOUND HALS

| EXAMPLE # | QUV EXPOSURE | | | | | | | | | | | | | |
|---|---|---|---|---|---|---|---|---|---|---|---|---|---|---|
| | INITIAL | | 3 DAYS | | | 5 DAYS | | | 7 DAYS | | | 10 DAYS | | |
| OF RESIN | % EL | YID | % EL | % RE | DE | % EL | % RE | DE | % EL | % RE | DE | % EL | % RE | DE |
| XXXII | 138 | 19.5 | 106 | 77 | 1.0 | 131 | 95 | 1.7 | 206 | 149 | 1.9 | 38 | 28 | 2.1 |
| XXXIII | 231 | 21.1 | 156 | 70 | 2.7 | 106 | 46 | 2.0 | 131 | 57 | 1.1 | 56 | 24 | 2.0 |
| XXXIV | 213 | 27.0 | 156 | 74 | 1.3 | 119 | 56 | 0.8 | 119 | 56 | 0.5 | 50 | 24 | 1.0 |
| XXXV | 163 | 23.7 | 119 | 73 | 1.8 | 119 | 73 | 1.9 | 106 | 68 | 1.8 | 31 | 19 | 2.0 |
| XXXVI | 238 | 20.2 | 138 | 58 | 1.5 | 125 | 53 | 1.9 | 138 | 58 | 1.5 | 25 | 11 | 1.9 |
| XXXVII | 181 | 24.3 | 119 | 66 | 1.9 | 88 | 48 | 1.5 | 100 | 55 | 3.5 | 56 | 31 | 1.6 |
| XXXVIII | 156 | 32.2 | 163 | 104 | 1.9 | 94 | 60 | 2.0 | 106 | 72 | 2.0 | 44 | 28 | 1.8 |
| XXXIX | 69 | 22.5 | 38 | 55 | 3.1 | 38 | 55 | 2.6 | 25 | 36 | 2.6 | 25 | 36 | 2.9 |
| XL | 306 | 17.2 | 150 | 49 | 2.3 | 119 | 39 | 2.0 | 150 | 49 | 1.8 | 106 | 35 | 1.9 |
| XLI | 319 | 17.9 | 163 | 49 | 1.0 | 100 | 31 | 2.0 | 106 | 35 | 2.1 | 69 | 22 | 2.2 |
| XLII | 244 | 18.3 | 175 | 72 | 1.5 | 113 | 46 | 1.6 | 169 | 69 | 1.4 | 113 | 46 | 3.5 |
| XLIII | 225 | 21.4 | 175 | 78 | 1.5 | 106 | 47 | 1.4 | 150 | 67 | 1.2 | 113 | 50 | 1.6 |
| XLIV | 231 | 16.4 | 163 | 70 | 0.8 | 256 | 110 | 1.1 | 150 | 65 | 1.1 | 19 | 8 | 1.1 |
| XLV | 194 | 18.0 | 206 | 106 | 1.8 | 125 | 65 | 2.0 | 88 | 45 | 3.1 | 81 | 42 | 2.8 |
| XLVI | 419 | 16.6 | 194 | 46 | 2.1 | 106 | 25 | 1.8 | 194 | 36 | 1.7 | 100 | 24 | 1.9 |
| XLVII | 231 | 18.3 | 213 | 92 | 1.2 | 200 | 86 | 1.8 | 150 | 65 | 2.2 | 63 | 24 | 2.5 |
| C-1 | 163 | 18.3 | 13 | 8 | 3.0* | 6 | 4 | 5.0* | BB | | | BB | | 3.4* |
| C-2 | 100 | 17.7 | 6 | 6 | 4.0* | 6 | 6 | 4.5* | BB | | | BB | | 4.0* |
| C-3 | 113 | 17.1 | 63 | 56 | 0.5 | 6 | 6 | 1.0 | BB | | | BB | | 3.3* |
| C-4 | 125 | 19.8 | 113 | 90 | 2.4 | 63 | 50 | 2.8 | 38 | 30 | 4.3 | 19 | 15 | 5.4 |

| EXAMPLE # | 15 DAYS | | | 20 DAYS | | | DAYS TO | DAYS TO |
|---|---|---|---|---|---|---|---|---|
| OF RESIN | % EL | % RE | DE | % EL | % RE | DE | C & C | BB |
| XXXII | | | | 31 | 22 | 3.6 | >20 <25 | >20 <25 |
| XXXIII | 19 | 8 | 2.3 | BB | | 3.9 | 23 | >15 <20 |
| XXXIV | 56 | 26 | 0.6 | 19 | 9 | 2.3 | 22 | >20 <25 |
| XXXV | 113 | 69 | 1.4 | 13 | 8 | 2.1 | 22 | >20 <25 |
| XXXVI | 25 | 11 | 2.5 | 13 | 5 | 3.4 | 22 | >20 <25 |
| XXXVII | 56 | 31 | 1.5 | 31 | 17 | 1.6 | | >20 <25 |
| XXXVIII | 94 | 60 | 1.4 | 6 | 4 | 1.5 | 30 | >25 <30 |
| XXXIX | 25 | 36 | 3.0 | BB | | | 20 | >15 <20 |
| XL | 25 | 8 | 4.3 | BB | | 5.2 | >21 <25 | >15 <20 |
| XLI | | | | 63 | 20 | 2.7 | >25 | >20 <25 |
| XLII | 31 | 13 | 3.7 | BB | | 4.7 | 20 | >15 <20 |
| XLIII | 31 | 16 | 1.5 | | | | >25 | |
| XLIV | | | | 131 | 84 | 3.7 | | >20 <25 |
| XLV | 25 | 13 | 2.6 | | | | >25 | |
| XLVI | 44 | 11 | 3.0 | | | | >20 <25 | |
| XLVII | | | | 125 | 54 | 3.1 | >25 | >25 |
| C-1 | BB | | | BB | | | <3 | >5 <7 |
| C-2 | BB | | | BB | | | <3 | >5 <7 |
| C-3 | BB | | | BB | | | >7 <10 | >5 <7 |
| C-4 | 19 | 15 | 6.5 | BB | | 6.6 | >40 <45 | >15 <20 |

LEGEND:
% EL = PERCENT ELONGATION
% RE = PERCENT RETAINED ELONGATION
DE = TOTAL COLOR CHANGE (DELTA E)
C & C = CRACKING AND CRAZING
BB = BRITTLE BREAK OCCURED
C-3 = UNSTABILIZED POLYPROPYLENE EXTRUDED TWICE
C-4 = UNSTABILIZED POLYPROPYLENE EXTRUDED ONCE
*SAMPLE CRAZED AND CHALKY

EXAMPLE XLVIII

Evaluation of Polymer Bound Hindered Amine Light Stabilizers in the Stabilization of Dylark TM 250

Dylark TM 250 samples containing bound HALS groups at 0.5% concentration were prepared by reacting 0.5 parts HALS hydrazide A with 100 parts Dylark TM 250 in an extruder at 220° C. using the procedure described in Example XXVII. Dylark TM 250 samples containing bound HALS groups at 0.25% concentration and 0.25% Tinuvin P were prepared in a similar manner by reacting 0.25 parts HALS hydrazide A with 100 parts Dylark TM 250 in the presence of 0.25 parts Tinuvin P. Dylark TM 250 was also extruded with 0.75 parts of the polymer bound HALS from Example III (containing 35% bound HALS) and 0.25% Tinuvin P per 100 parts Dylark TM 250. A comparative sample containing 0.25 parts Tinuvin 770 and 0.25 parts Tinuvin P was also extruded. The extrudates were pelletized and injection molded into tensile bars as in Example XXXI. Control samples of unmodified Dylark TM 250 were also injection molded. The Izod impact strength and color formation of each sample as a function of QUV weathering were determined. The results are summarized in Table VI.

The results indicate that the HALS compounds (both bound and blended) are more effective in the stabilization of Dylark TM 250 when they are used in combination with a UV absorber such as a 2-(2-hydroxyphenyl)-2H-benzotriazole (Tinuvin P).

EXAMPLE L

N-(2,2,6,6-tetramethyl-4-piperidinyl)-N'-aminooxamide and Jeffamine ®M-600 to Octadecene-Maleic Anhydride Copolymer in an Extruder A blend of 145 grams (0.60 mole) of HALS hydrazide A and 350 grams of PA-18 was prepared by dry mixing the components in a poly jug. After uniformity was achieved, 120 grams of Jeffamine ® M-600 was added dropwise with shaking. Some lumping occurred during the addition of the liquid Jeffamine. After completion of the Jeffamine addition, the blend was transferred to a Waring blender to break up the lumps. The resultant free flowing powder was transferred back to a poly jug and shaken well to obtain a uniform blend.

The blend was added to the Brabender Prep Center extruder as in Example XXIX and extruded at 210° C. at a screw speed of 30 RPM. The first 100 grams of extrudate were used to purge out the extruder and were discarded. The remaining extrudate was air cooled and pelletized. The extrudate was a light weight foamed product which could easily be crushed by hand into a fine free flowing powder. An IR scan of the extrudate dissolved in the chloroform contained a very weak carbonyl band at 1780 $cm^{-1}$ and strong carbonyl bands at 1725 $cm^{-1}$ and 1675 $cm^{-1}$.

EXAMPLES LI to LXII

Evaluation of Polymer Bound Hindered Amine Light Stabilizers in the Stabilization of Polyethylene

TABLE VI

Stabilization of Dylark TM 250 With Polymer Bound HALS and UV Absorbers

| | | 0 Hours QUV | | 100 Hours QUV | | | 250 Hours QUV | | | 1000 Hours QUV | | |
|---|---|---|---|---|---|---|---|---|---|---|---|---|
| Resin Formulation | Conc. | Izod Impact ft/lbs/in | YID | Δ Izod | Δ YID | Δ E | Δ Izod | Δ YID | Δ E | Δ Izod | Δ YID | Δ E |
| Dylark TM 250 Control | 100% | 39 | 1 | −0.7 | 42 | 22 | −0.7 | 46 | 24 | −0.7 | 54 | 28 |
| Dylark TM 250 | 99.5% | 3.7 | 3 | −0.4 | 37 | 19 | −0.5 | 42 | 22 | −0.5 | 50 | 26 |
| HALS Hydrazide A | 0.5% | | | | | | | | | | | |
| Dylark TM 250 | 99.5% | 3.8 | 3 | −0.7 | 36 | 19 | −0.7 | 43 | 22 | −0.5 | 50 | 26 |
| Tinuvin 770 | 0.5% | | | | | | | | | | | |
| Dylark TM 250 | 99.5% | 3.6 | 6 | −0.5 | 24 | 13 | −0.6 | 30 | 15 | −0.6 | 33 | 17 |
| HALS Hydrazide A | 0.25% | | | | | | | | | | | |
| Tinuvin P | 0.25% | | | | | | | | | | | |
| Dylark TM 250 | 99.5% | 3.6 | 5 | −0.5 | 26 | 13 | −0.6 | 31 | 16 | −0.6 | 35 | 18 |
| Tinuvin 770 | 0.25% | | | | | | | | | | | |
| Tinuvin P | 0.25% | | | | | | | | | | | |
| Dylark TM 250 | 99.0% | 3.5 | 5 | −0.5 | 27 | 14 | −0.5 | 34 | 18 | −0.5 | 39 | 20 |
| HALS Adduct of Example II | 0.75% | | | | | | | | | | | |
| Tinuvin P | 0.25% | | | | | | | | | | | |

Tinuvin P is a 2-(2-hydroxyphenyl)-2H-benzotriazole commercially available from Ciba-Geigy

EXAMPLE XLIX

Attachment of a Hydrazido Substituted Hindered Amine Light Stabilizer to a Maleic Anhydride Copolymer in an Extruder A blend of 750 grams of Cadon TM 140 (dried for 2 hours at 90° C.) and 3.75 grams of HALS hydrazide A was prepared by shaking the components in a gallon jug. The blend was then extruded at 215°-220° C. in a Brabender Prep Center Extruder. The extrudate was pelletized and passed through the extruder again at 215°-220° C. The extrudate was cooled, pelletized and injection molded into $7\frac{3}{8}'' \times \frac{3}{4}'' \times \frac{1}{8}''$ tensile bars as in Example XXXI.

The polymer bound stabilizers (see Table VII) were dry blended with ground up polyethylene resin (CIL Inc's 605N) and optionally a small amount of Irganox 1076. The blends were shaken well to insure a good dispersion of the additives in the polyethylene. The blends were then extruded on a Brabender prep Center Extruder Model No. 1340. The extruder was operated at a screw speed of 30 RPM. In Examples LI and LVII, the heating zones were held at 200° C. and the die was heated to 210° C. The melt temperature of the resin was 201° C. (see Table VII). In Examples LVIII to LXII the heating zone temperature was varied from 215° to 245° C. and the die temperature from 225° C. to 255° C. The extrudate was air cooled with a series of fans below a chain link conveyor belt. The optimum extrusion temperature appeared to be around 217° to 225° C. The concentration of the 2,2,6,6-tetramethyl-4-piperidinyl group in the extrudate was 0.44%.

TABLE VII

EXTRUSION OF POLYETHYLENE WITH POLYMER BOUND HINDERED AMINE LIGHT STABILIZERS

| EXAMPLE # | HALS FROM EXAMPLE # | GRAMS HALS | GRAMS PE* | GRAMS IR 1076** | EXTRUSION TEMP C. |
|---|---|---|---|---|---|
| LI | XX | 4.9 | 270 | | 200 |
| LII | XXIX | 7.2 | 340 | | 200 |
| LIII | XXIX | 7.2 | 340 | 0.9 | 200 |
| LIV | XXIII | 8.0 | 290 | | 200 |
| LV | XXIII | 8.0 | 290 | 0.8 | 200 |
| LVI | XXV | 12.0 | 260 | | 200 |
| LVII | XXV | 12.0 | 260 | 0.7 | 200 |
| LVIII | XXIX | 6.2 | 290 | | 225 |
| LIX | XXIX | 6.2 | 290 | | 237 |
| LX | XXIX | 6.2 | 290 | | 247 |
| LXI | XXIX | 6.2 | 290 | | 217 |
| LXII | XXIX | 6.2 | 290 | .08 | 222 |

*PE is polyethylene
**IR 1076 is Irganox 1076 (Ciba-Geigy)

What is claimed:

1. A polymer with recurring units selected from

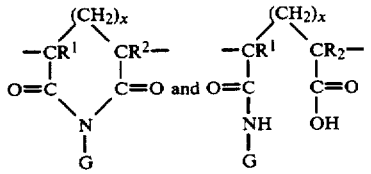

or both in which the units occur either in the polymer backbone, or as pendant units, or both and wherein $R^1$ and $R^2$ are independently selected from hydrogen, alkyl of 1 to 6 carbons, cycloakyl of 5 to 7 carbons, phenyl, chlorine, or bromine, x is an integer of 0 or 1, and

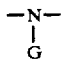

represents the residue of a hydrazido substituted hindered amine light stabilizer group.

2. The polymer bound hindered amine light stabilizer composition of claim 1 wherein G has the structure

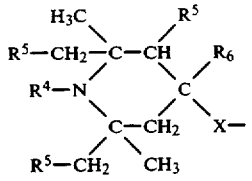

where $R^4$ is selected from hydrogen, oxyl, hydroxyl, alkyl of 1 to 20 carbons, alkenyl or alkynyl of 3 to 8 carbons, aralkyl of 7 to 12 carbons, aliphatic acyl of 1 to 10 carbons, aromatic acyl of 7 to 13 carbons, alkoxycarbonyl of 2 to 9 carbons, aryloxycarbonyl of 7 to 15 carbons, alkyl, aryl, cycloalkyl or aralkyl substituted carbamoyl of 2 to 13 carbons, hydroxyalkyl of 1 to 5 carbons, 2-cyanoethyl, epoxyalkyl of 3 to 10 carbons, or poly(oxyalkylene) of 4 to 30 carbons, $R^5$ is selected from hydrogen or alkyl of 1 to 4 carbons, $R^6$ is hydrogen, hydroxyl, or alkoxy of 1 to 4 carbons, and when $R^6$ is hydrogen, X is a divalent radical selected from $-Z-R^7-C(=O)-N(R^8)-$, $-Z-C(=O)-N(R^8)-$, $-Z-C(=O)-R^9-C(=O)-N(R^8)-$, $-R^7-C(=O)-N(R^8)-$, or $-C(=O)-N(R^8)-$, and Z is $-O-$, $-N(R^{10})-$, or $-N(R^{12})-R^{11}-N(R^{12})-$ and when $R^6$ is hydroxyl or alkoxy, X is a divalent radical selected from $-R^7-C(=O)-N(R^8)-$ or $-C(=O)-N(R^8)-$ and $R^7$ is an alkylene diradical of 1 to 4 carbons, $R^8$ is selected from hydrogen, primary or secondary alkyl of 1 to 8 carbons, aralkyl of 7 to 12 carbons or cycloalkyl of 5 to 12 carbons, $R^9$ is selected from a direct bond, or a substituted or unsubstituted radical of alkylene of 1 to 14 carbons, oxydialkylene of 4 to 10 carbons, thiodialkylene of 4 to 10 carbons, alkenylene of 2 to 10 carbons, o, m, or p-phenylene wherein the substituents are selected from lower alkyl, lower alkoxy, hydroxy, bromine, chlorine, mercapto or lower alkylmercapto, $R^{10}$ and $R^{12}$ are selected from hydrogen, alkyl of 1 to 10 carbons, aryl of 6 to 12 carbons or cycloalkyl of 5 to 12 carbons and $R^{10}$ may also be a radical of the formula

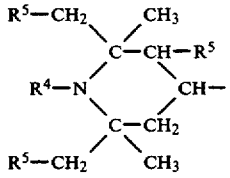

or a 2- cyanoethyl radical and $R^{11}$ is alkylene of 2 to 12 carbons.

3. The polymer bound hindered amine light stabilizer composition of claim 2 wherein $R^4$ is hydrogen, methyl, acetyl, benzoyl, 2-hydroxyethyl or benzyl, $R^5$ is hydrogen or methyl, $R^6$ is hydrogen, X is selected from $-Z-C(=O)-N(R^9)-$, $-Z-R^7-C(=O)-N(R^8)-$ or $-Z-C(=O)-R^9-C(=O)-N(R^8)-$, Z is $-O-$ or $-N(R^{10})-$, $R^7$ is $-(CH_2)_b-$, $R^8$ is hydrogen or methyl, $R^9$ is a direct bond or alkylene diradical of 1-7 carbons, b is 1 or 2 and $R^{10}$ is hydrogen or a 2,2,6,6-tetramethyl-4-piperidinyl radical.

4. The composition of claim 3 wherein $R^4$ is hydrogen or methyl, X is $-Z-R^7-C(=O)-N(R^8)-$, Z is $-N(R^{10})-$, $R^5$, $R^6$, $R^8$ and $R^{10}$ are hydrogen, and $R^7$ is $-(CH_2)_b-$.

5. The composition of claim 4 wherein $R^4$ is hydrogen and b is 1.

6. The composition of claim 4 wherein $R^4$ is hydrogen and b is 2.

7. The composition of claim 3 wherein $R^4$ is hydrogen, methyl, or acetyl, X is $-Z-C(=O)-R^9-C(=O)-N(R^8)-$, Z is $-N(R^{10})-$, and $R^5$, $R^6$, $R^8$ and $R^{10}$ are hydrogen.

8. The composition of claim 7 wherein $R^4$ is hydrogen and $R^9$ is a direct bond.

9. The composition of claim 7 wherein $R^4$ is hydrogen and $R^9$ is a 1,2-ethylene diradical.

10. The composition of claim 7 wherein $R^4$ is hydrogen and $R^9$ is a 1,4-butylene diradical.

11. The composition of claim 7 wherein $R^4$ is hydrogen and $R^9$ is 1,7-heptylene diradical.

12. The composition of claim 7 wherein $R^4$ is acetyl and $R^9$ is a direct bond.

13. The composition of claim 3 wherein X is —Z—C(=O)—$R^9$—C(=O)—N—($R^8$)—, Z is —N($R^{10}$)—, $R^4$, $R^5$, $R^6$ and $R^{10}$ are hydrogen, $R^8$ is methyl and $R^9$ is a direct bond.

14. The composition of claim 3 wherein X is —Z—C(=O)—N($R^8$)—, Z is —O—, $R^4$ is methyl and $R^5$, $R^6$ and $R^8$ are hydrogen.

15. The composition of claim 3 wherein Z is —Z—C(=O)—N($R^8$)—, Z is —N($R^{10}$)— and $R^4$, $R^5$, $R^6$, $R^8$ and $R^{10}$ are hydrogen.

16. A polymer composition comprising a synthetic polymer which is subject to thermal, oxidative, or actinic light degradation and an effective amount of the composition of claim 1 to stabilize the polymer composition against the degradative effects of heat or light.

17. The composition of claim 16 wherein the synthetic polymer or copolymer is selected from polystyrene, rubber-modified polystyrene, polyolefins, polyphenylene ether, polyamide or mixtures thereof.

18. The composition of claim 17 wherein the synthetic polymer is polypropylene.

19. The composition of claim 17 wherein the synthetic polymer is polyethylene.

*20. A compound, for producing a polymer bound hindered amine light stabilizer composition, of the formula:*

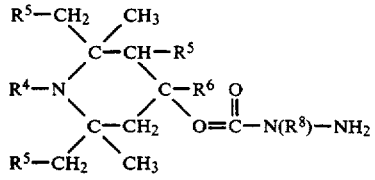

*wherein $R^4$ is a methyl group; and wherein each of $R^5$, $R^6$ and $R^8$ is hydrogen.*

*21. A compound, for producing a polymer bound hindered amine light stabilizer composition, of the formula:*

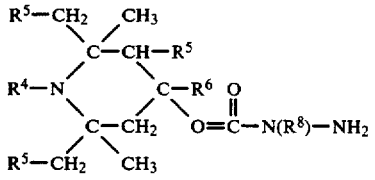

*wherein each of $R^4$; $R^5$; $R^6$; and $R^8$ is hydrogen.*

* * * * *